US012502610B2

(12) United States Patent
Iizuka et al.

(10) Patent No.: US 12,502,610 B2
(45) Date of Patent: Dec. 23, 2025

(54) GAME SYSTEM AND GAME CONTROL METHOD

(71) Applicants: BANDAI NAMCO Entertainment Inc., Tokyo (JP); Bandai Namco Experience Inc., Tokyo (JP)

(72) Inventors: Yuji Iizuka, Tokyo (JP); Takehito Sasaoka, Tokyo (JP); Takeharu Kijima, Tokyo (JP); Norihide Nakajima, Tokyo (JP)

(73) Assignees: BANDAI NAMCO Entertainment Inc., Tokyo (JP); Bandai Namco Experience Inc., Tokyo (JP)

( * ) Notice: Subject to any disclaimer, the term of this patent is extended or adjusted under 35 U.S.C. 154(b) by 286 days.

(21) Appl. No.: 18/552,312

(22) PCT Filed: Mar. 28, 2022

(86) PCT No.: PCT/JP2022/015132
§ 371 (c)(1),
(2) Date: Sep. 25, 2023

(87) PCT Pub. No.: WO2022/210583
PCT Pub. Date: Oct. 6, 2022

(65) Prior Publication Data

US 2024/0157249 A1 May 16, 2024

(30) Foreign Application Priority Data

Mar. 31, 2021 (JP) ................................ 2021-061855

(51) Int. Cl.
*A63F 13/67* (2014.01)
*A63F 13/44* (2014.01)
(Continued)

(52) U.S. Cl.
CPC .............. *A63F 13/67* (2014.09); *A63F 13/44* (2014.09); *A63F 13/53* (2014.09); *A63F 13/55* (2014.09); *A63F 13/814* (2014.09); *A63F 13/843* (2014.09)

(58) Field of Classification Search
CPC .......... A63F 13/67; A63F 13/44; A63F 13/53; A63F 13/55; A63F 13/814; A63F 13/843; A63F 13/5375; A63F 13/54
See application file for complete search history.

(56) References Cited

U.S. PATENT DOCUMENTS 8,686,269 B2 * 4/2014 Schmidt ................. G10H 1/342 84/478
2002/0002411 A1 * 1/2002 Higurashi ............... A63F 13/44 700/91
(Continued)

FOREIGN PATENT DOCUMENTS

JP 3031676 B1 4/2000
JP 2016-193053 A 11/2016
(Continued)

OTHER PUBLICATIONS

International Search Report of the International Searching Authority mailed Jun. 14, 2022 for the corresponding International Application No. PCT/JP2022/015132 (and English translation).

*Primary Examiner* — Thomas H Henry
(74) *Attorney, Agent, or Firm* — Posz Law Group, PLC

(57) ABSTRACT

The present invention can provide a game system and the like that improves the interest of the game in playing a plurality of people by adjusting difficulty of a game with maintaining game enjoyment based on the timing of operation inputs, and providing the production for livening up a battle performed by a plurality of players. The game system S of the present embodiment performs an evaluation process of an evaluation for each player based on an operation input
(Continued)

timing and a given relationship between a mark object for determining operation input timing and an operation timing object; moves, in a second direction that is a direction opposite to the first direction, the corresponding operating-system object formation area in accordance with the evaluation of the evaluation process; and set at least a part of the operating-system object formation area to the non-display range.

13 Claims, 19 Drawing Sheets

(51) Int. Cl.

| | |
|---|---|
| ***A63F 13/53*** | (2014.01) |
| ***A63F 13/55*** | (2014.01) |
| ***A63F 13/814*** | (2014.01) |
| ***A63F 13/843*** | (2014.01) |

(56) References Cited

U.S. PATENT DOCUMENTS

2002/0025842 A1* 2/2002 Nobe ...................... A63F 13/67
463/7
2007/0163427 A1* 7/2007 Rigopulos ............ G10H 1/0008
84/609
2010/0257993 A1* 10/2010 Brow .................... A63F 13/245
84/478
2018/0008893 A1 1/2018 Katagai

FOREIGN PATENT DOCUMENTS

JP 2018-108422 A 7/2018
JP 2019-000457 A 1/2019
JP 2019-098117 A 6/2019
JP 2020-081755 A 6/2020

* cited by examiner

GAME SYSTEM AND GAME CONTROL METHOD

CROSS REFERENCE TO RELATED APPLICATIONS

This application is a U.S. national stage application of PCT/JP2022/015132 filed on Mar. 28, 2022, which is based on and claims priority to Japanese Patent Application No. 2021-061855 filed on Mar. 31, 2021, the contents of which are incorporated herein by reference.

TECHNICAL FIELD

The present invention relates to a game system and a game control method.

BACKGROUND OF THE INVENTION

In the related art, one type of game genre is known as a timing input game in which input operations are performed in accordance with the cadence of music to be sound-output.

Recently, for example, a timing input game using music has a configuration in which objects indicating an operation timing are moved and displayed in accordance with the playback of a task song, and the operation input timing is indicated by a timing at which each of the objects reaches a predetermined positions.

For example, there is known such a game that controls the display of an image that hinders taking the operation input timing of the player and the operation input, thereby enhancing game enjoyment and enhancing the interest of the player (Japanese Patent No. 3031676, for example).

SUMMARY OF INVENTION

Problem to be Solved by the Invention

However, in the game or the game system providing the game described in Japanese Patent No. 3031676, basically, the game simply hinders the operation of the player. By controlling display of the object indicating the operation timing and display of the surroundings thereof, evaluations of the corresponding players for a game are not visualized. There is a demand for further devise as a game competing by a plurality of players.

The present invention can provide a game system and the like that improves the interest of the game in playing a plurality of people by adjusting difficulty of a game with maintaining game enjoyment based on the timing of operation inputs, and providing the production for raising a battle performed by a plurality of players.

Solution to Problem (1) in a game system according to a first aspect of the invention, there is provided the game system for controlling a given game evaluating operational inputs of each player entered by a plurality of players, the system having:

a receiving process unit for receiving operational inputs of the players;

a display range control unit for performing a display range control process of controlling a display range of an operating-system object formation area for each of the players, the operating-system object formation area being an area where a first game object to be subjected to operation input by each player and a second game object different from the first game object and used to instruct each player to input operation are formed;

an object control unit for performing at least one of a movement control process of moving the second game object in a first direction within the operating-system object formation area and a movement control process of moving the first game object in a second direction that is a direction opposite the first direction; and an evaluation unit for performing, for each player, an evaluation process of evaluating each player on the basis of an operation input when an operation input of the player is received and a given relationship between the first game object and the second game object in the operation input, wherein the display range control unit, as the display range control process: moves the operating-system object formation area including the first game object and the second game object toward the second direction in accordance with an evaluation result of the evaluation process; and sets, to a non-display range, at least a part of the operating-system object formation area.

In a game method according to a second aspect of the invention, there is provided the game method for controlling a given game evaluating operational inputs of each player entered by a plurality of players, the system having:

receiving operational inputs of the players;

performing a display range control process of controlling a display range of an operating-system object formation area for each of the players, the operating-system object formation area being an area where a first game object to be subjected to operation input by each player and a second game object different from the first game object and used to instruct each player to input operation are formed;

performing at least one of a movement control process of moving the second game object in a first direction within the operating-system object formation area and a movement control process of moving the first game object in a second direction that is a direction opposite the first direction; and performing, for each player, an evaluation process of evaluating each player on the basis of an operation input when an operation input of the player is received and a given relationship between the first game object and the second game object in the operation input, wherein, as the display range control process: the operating-system object formation area including the first game object and the second game object is moved, toward the second direction in accordance with an evaluation result of the evaluation process; and at least a part of the operating-system object formation area is set to a non-display range.

BRIEF DESCRIPTION OF DRAWINGS

FIG. 4 B is a diagram for explaining the basic principle of the operating-system object movement control process according to the embodiment of the present invention.

FIG. 4 C is a diagram for explaining the basic principle of the operating-system object movement control process according to the embodiment of the present invention.

FIG. 5 B is a diagram for explaining evaluation process of the embodiment of the present invention.

FIG. 7 B is a diagram for explaining evaluation process of the one embodiment of the present invention.

DETAILED DESCRIPTION OF THE EMBODIMENT

Figure 1:
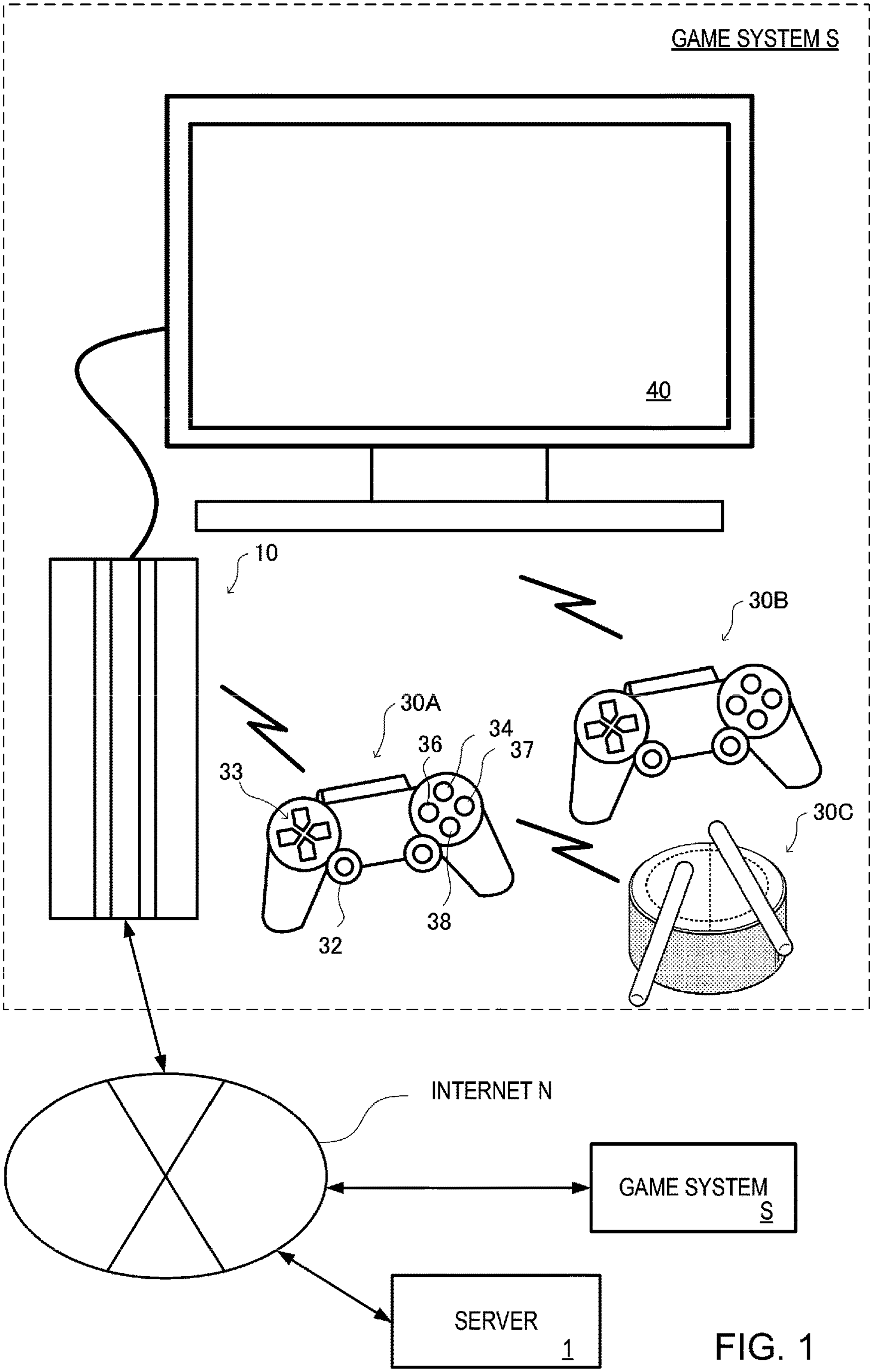
FIG. 1 is an example of a system configuration diagram illustrating a game system configuration according to one embodiment of the present invention.

According to an embodiment of the invention, there is provided a game system for controlling a given game evaluating operational inputs of each player entered by a plurality of players, the system including:

a receiving process unit for receiving operational inputs of the players;

a display range control unit for performing a display range control process of controlling a display range of an operating-system object formation area for each of the players, the operating-system object formation area being an area where a first game object to be subjected to operation input by each player and a second game object different from the first game object and used to instruct each player to input operation are formed;

an object control unit for performing at least one of a movement control process of moving the second game object in a first direction within the operating-system object formation area and a movement control process of moving the first game object in a second direction that is a direction opposite the first direction; and an evaluation unit for performing, for each player, an evaluation process of evaluating each player on the basis of an operation input when an operation input of the player is received and a given relationship between the First game object and the second game object in the operation input, wherein the display range control unit, as the display range control process: moves the operating-system object formation area including the first game object and the second game object toward the second direction in accordance with an evaluation result of the evaluation process; and sets, to a non-display range, at least a part of the operating-system object formation area.

Based on this configuration, the one embodiment of the present invention can control the display period of the first game object or the second game object in accordance with the result of the evaluation process. Therefore, the one embodiment of the present invention can adjust the operation reaction time for the player, and can allow the player itself and other players to visually recognize the results of the evaluation process.

For example, when the evaluation of the player is increased by the evaluation process, in a case where the display range is narrowed by moving the operating-system object formation area toward the non-display area in a direction opposite to the movement direction of the first game object or the second game object, the one embodiment of the present invention can shorten the display period of the first game object or the second game object (that is, the period of time that the player visually recognizes). Therefore, the one embodiment of the invention can shorten the time from player reaction to player operation (hereinafter, referred to as "operation reaction time").

Accordingly, the one embodiment of the present invention can adjust the difficulty of the game by controlling the operation reaction time, and can provide a production for livening up the battle game performed by a plurality of the players. As a result, the one embodiment of the present invention can improve the interest of the game (in particular, the interest of the multi-play game).

The "given game" is preferably, for example, a game that evaluates the accuracy of the operation input timing of the player based on the operation of the player in accordance with a sound or rhythm such as a music game (so-called sound game). Further, not only these games, but the game can also be applied to the given game as long as the game evaluates the accuracy of the player's operation input regardless of the operation timing.

The "first game object" is, for example, an object for determining an operation timing of a player together with a second game object in the case where the game is a rhythm music game. The "first game object" is a marker object for determining an operation input timing, which is a reference for the operation input timing (hereinafter, also referred to as a "marker object for determining operation input timing" in the case of a rhythm music game).

The "second game object" is, for example, an object for determining an operation timing of a player together with the first game object in the case where the game is a rhythm music game. The "second game object" is an object that indicates operation contents inputted by the player when overlapped with the first game object (hereinafter, also referred to as an "operation timing object" in the case of a rhythm music game).

The "evaluation process" is an evaluation of the operation result of the player, and in the case of a rhythm music game, for example, indicates performing evaluation whether the instruction content of the second game object has been input at a designated timing.

For example, the "evaluation process" includes the number of successes, the number of failures, the timing match, the number of consecutive successes (so-called combo numbers), and the like of the specified operation input.

The "given relationship" includes a timing (temporal) relationship between the first game object and the second game object, a positional relationship between the first game object and the second game object in the operating-system object formation area, and the like.

The "display range control process" indicates that, while the first game object, the second game object, or both are maintained in a moved state, at least a portion of the operating-system object formation area is hidden, and the display range of the operating-system object formation area is controlled to be wide or narrow.

The "hiding at least a portion of the area" includes hiding the entire area (as a limit value) of the operating-system object formation area. When the entire operating-system object formation area is hidden, difficulty of the operation of the player increases dramatically because the player can not visually determinate the operation timing, and then, basically it is preferable to ensure that the marker object for operation input timing determination is displayed.

(2) According to the embodiment of the invention, there may be provided the game system wherein:

the first game object is a mark object for determining operation input timing that is used to determine operation input timing for each of the players, and the second game object is an operation timing object that indicates operation input timing for each players, and the evaluation unit evaluates, as the evaluation process, each player based on the operation input timing when an operation input of the player is received and the given relationship between the mark object for determining operation input timing and, the operation timing object at the operation input timing.

Based on this configuration, the one embodiment of the present invention can adjust the difficulty of the game by controlling the operation reaction time with maintaining game enjoyment based on the timing of operation inputs. Further, the one embodiment of the present invention can provide a production for livening up the battle game performed by a plurality of the players. Therefore, the one embodiment of the present invention can improve the interest of the game (in particular, the interest of the multi-play game).

Especially, the one embodiment of the present invention can control the display period of the marker object for determining operation input timing or the second game object (For example, an operation timing object) in accordance with the result of the evaluation process, Therefore, the one embodiment of the present invention can adjust the operation reaction time for the player, and can allow the player itself and other players to visually recognize the results of the evaluation process.

(3) According to the embodiment of the invention, there may be provided the game system wherein:

the game status includes a length of term from the stop-playing timing to an end timing when a game progression is terminated;

the game status identification unit identifies the game status including the length of term; and the task identification unit identifies the task information from among a plurality of task information stored in the first memory unit according to an identified game status including the length of term.

Based on this configuration, the one embodiment of the present invention can, for example, when the evaluation of the player is decreased by the evaluation process, in a case where the display range is widened by moving the operating-system object formation area in a same direction as the movement direction of the first game object (the marker object for determining operation input timing) or the second game object (the operation timing object), the one embodiment of the present invention can lengthen the display period of the first game object or the second game object (that is, the period of time that the player visually recognizes). Therefore, the one embodiment of the invention can lengthen the operation reaction time.

Accordingly, the one embodiment of the present invention can lengthen or shorten the operation reaction time of the player according to the result of the player's operation, and thus can balance the difficulty of the game.

(4) According to the embodiment of the invention, there may be provided the game system further having: a timing setting unit to set, as a game instruction control process, a restart timing for restarting the game control process of a task setting target game that is a game used for setting the task according to the player's input operation, based on the identified stop-playing timing, wherein the game status identification unit: identities, as a game status at the restart timing, the game status at the stop-playing timing or the game status up to the stop-playing timing; and performs a determination process to determine given settings of the game according to the player's input operation for the task setting target game when starting the game control process, based on the identified game status, and the game control unit performs, as a game instruction control process, the game control process from the restart timing based on the settings determined by the determination process and an accepted player's input operation.

Based on this configuration, the one embodiment of the present invention can change the display area or non-display area of the operating-system object formation area in accordance with the evaluation at the evaluation timing and in the evaluation period, and thus, can adjust the operation reaction time for the player, and can allow the player itself and other players to visually recognize the results of the evaluation process.

(5) According to the embodiment of the invention, there may be provided the game system wherein:

the game status identification unit identifies, as the game status, the game status of an identification term, which includes the game status at the stop-playing timing, from a given timing to the stop-playing timing, and the task identification unit identifies the task information corresponding to the game status of the identification term from among the plurality of task information stored in the first memory unit.

Based on this configuration, the one embodiment of the present invention can change the display area or non-display area of the operating-system object formation area in accordance with the evaluation of the entire evaluation period.

For example, the "evaluation period" includes a predetermined game section, and further:

(A1) a period of time determined on the progress of the game in the case of the music game, such as a bar, a verse, a bridge or a chorus;

(A2) a period of time during which the event has occurred, (A3) a period of time from the first timing to the second timing predetermined during playing the game, and (A4) a period of time specified by the player.

(6) According to the embodiment of the invention, there may be provided the game system wherein:

the evaluation unit, as the evaluation process: determines whether a result of the operation of the player or a result of the game being executed based on the operation of the player meets a given condition; and identifies the result of the determination as the evaluation; and the display range control unit moves the operating-system object formation area in accordance with an evaluation of a result of the determination.

Based on this configuration, the one embodiment of the present invention can change the movement direction of the operating-system object formation area based on whether a given condition is met or not.

Therefore, the one embodiment of the present invention can adjust the operation reaction time for the player in accordance with the evaluation status of the operation inputted by the player, and can allow the player itself and other players to visually recognize the results of the evaluation process.

The "given condition" includes that:

(B1) the input of the operation content indicated by the second game object (for example, the operation timing object) succeeds;

(B2) at the timing of the operation inputted by the player: the timing relationship between the first game object (for example, the marker object for determining operation input timing) and the second game object; or the positional relationship of the first and second game objects within the operating-system object formation area fulfills a predetermined success condition; and (B3) a preset parameter, such as scores and the number of items acquired, fulfills a predetermined condition.

(7) According to the embodiment of the invention, there may be provided the game system wherein:

the evaluation unit identifies, as the evaluation process, combination of evaluations evaluated based on the operation input of each player of the same group for each group constituted by the plurality of player; and the display range control unit, as the display range control process, controls the display range of the operating-system object formation area in accordance with the specified combination of the evaluations.

Based on this configuration, the one embodiment of the present invention can also be applied to perform a group battle, and thus can incorporated into a wide variety of games because of versatile.

(8) According to the embodiment of the invention, there may be provided the game system wherein:

the display range control unit, when performing the display range control process, changes a setting ratio of the non-display range of the operating-system object formation area in accordance with the evaluation, based on a number of players in which the game is executed.

Based on this configuration, the one embodiment of the present invention can, for example, even though the evaluation results are the same, when the number of players is large, set more or less areas to be hidden during the game than when the number of players is small. Therefore, the one embodiment of the present invention can improve the visibility of the player during the game, or allow the players to play the tight game even if there is a difference in ability between the players.

(9) According to the embodiment of the invention, there may be provided the game system further including a display control unit for displaying information regarding the game of the player as player information in a blank area generated by the movement of the operating-system object formation area.

Based on this configuration, the one embodiment of the present invention can, for example, effectively utilize blank areas in the game area such as displaying information indicating the current status of the player or other player status, and thus can improve the convenience of the player.

(10) According to the embodiment of the invention, there may be provided the game system further including a production control unit for controlling a given production for the operating-system object formation area in accordance with a movement amount of the operating-system object formation area caused by performing the display range control process.

Based on this configuration, the one embodiment of the present invention can increase more decorative effect of the operating-system object formation area (such as making the periphery of the operating-system object formation area shine, and changing the color to a flashy color) of the top operating player (e.g. the operating-system object formation area that moves significantly in the second direction) more than the operating-system object formation area of the other player (s).

Therefore, the one embodiment of the present invention can liven up the battle game performed by a plurality of the players.

(11) According to the embodiment of the invention, there may be provided the game system wherein:

the display range control unit:

amends a movement amount of the operating-system object formation area in accordance with the evaluation result of the evaluation process and a game result of the player; and moves the operating-system object formation area in a second direction that is a direction opposite to the first direction on the basis of the amended movement amount.

Based on this configuration, the one embodiment of the present invention can, for example, increase the movement amount of the operating-system object formation area of the player with a low game result, or decrease the movement amount of the operating-system object formation area of a player with a significantly high game result, and can provide the production of the game so that the players play the tight game even if there is a difference in ability between the players.

(12) According to the embodiment of the invention, there may be provided the game system wherein:

the display range control unit:

amends a movement amount of the operating-system object formation area in accordance with the evaluation result of the evaluation process and a degree of progress of the game; and moves the operating-system object formation area in a second direction that is a direction opposite to the first direction on the basis of the amended movement amount.

Based on this configuration, the one embodiment of the present invention can, for example, provide the production of the game so that the players play the tight game and great reversal occurs.

(13) According to the embodiment of the invention, there may be provided the game control method for controlling a given game evaluating operational inputs of each player entered by a plurality of players, the method including:

receiving operational inputs of the players;

performing a display range control process of controlling a display range of an operating-system object formation area for each of the players, the operating-system object formation area being an area where a first game object to be subjected to operation input by each player and a second game object different from the first game object and used to instruct each player to input operation are formed, performing at least one of a movement control process of moving the second game object in a first direction within the operating-system object formation area and a movement control process of moving the first game object in a second direction that is a direction opposite the first direction; and performing, for each player, an evaluation process of evaluating each player on the basis of an operation input when an operation input of the player is received and a given relationship between the first game object and the second game object in the operation input, wherein, as the display range control process: the operating-system object formation area including the first game object and the second game object is moved toward the second direction in accordance with an evaluation result of the evaluation process; and at least a part of the operating-system object formation area is set to a non-display range.

Based on this configuration, the one embodiment of the present invention can control the display period of the first game object or the second game object in accordance with the result of the evaluation process. Therefore, the one embodiment of the present invention can adjust the operation reaction time for the player, and can allow the player itself and other players to visually recognize the results of the evaluation process.

Accordingly, the one embodiment of the present invention can adjust the difficulty of the game by controlling the operation reaction time, and can provide a production for livening up the battle game performed by a plurality of the players. As a result, the one embodiment of the present invention can improve the interest of the game (in particular, the interest of the multi-play game).

Hereinafter, embodiments of the present invention will be described. Note that the following embodiments do not unduly limit the scope of the invention as stated in the claims. In addition, all of the elements described in connection with the following embodiments should not necessarily be taken as essential requirements of the invention.

[1] Outline of the Game System

First, the outline and configuration of the game system S in the present embodiment will be described with reference FIG. 1. FIG. 1 is an example of a system configuration diagram illustrating configuration of the game system S according to the present embodiment.

The game system S according to the present embodiment is a music game in a battle by a plurality of players, and is configured to: evaluate, for each player, an operation timing of each player based on an operation input timing of each player inputted in accordance with an instruction of the game; and control a game (hereinafter, also referred to as a "rhythm battle game") for each player to compete based on the evaluation results.

Specifically, the game system S according to the present embodiment has: one or more controllers 30 operated by a player; a game main unit 10 that performs game process; and a display 40 that displays game images.

The game system S is configured to perform a battle game based on a game program or game data read from a memory, which is an information storage medium, or an operation signal inputted from the controller 30, in order to allow the players to enjoy playing the battle game while viewing a game screen displayed on the display 40.

For example, the game system S is configured to accept input operations based on the joystick 32, the cross key 33, and various buttons on the controller 30 operated by the player; to start the game; set various settings; to perform an evaluation of each player based on operation input timings received during execution of the game; and play a battle (such as a player who enters instructions to another controller 30B connected to the game system 5, a player who operates another game system S connected via a network N or the CPU).

In the present embodiment, information is transmitted and received between the controller 30 and the game main unit 10 through wireless communication. Instead, the controller 30 and the game main unit 10 may be connected by a communication cable, and information may be transmitted and received through the communication cable.

The main unit 10 performs the game process based on the instruction of the player (or a plurality of players when a plurality of controllers 30 are connected) via, the controller 30, and based on process results, displays various game images on the display 40, and outputs various sound, such as BGM, form a speaker (not shown) during the game.

The controller 30 has: a joystick 32; cross keys 33; and a plurality of buttons 34, 36, 37 and 38 formed on the entire front surface.

The controller 30 is also configured to recognize as a special operation instruction when inputting the player's input operation by a plurality of buttons simultaneously, or when inputting the player's input operation by a combination of the direction in which the cross key 33 is pressed down (including diagonal direction and neutral) and the buttons.

In addition to the above, the controller 30 has the plurality of buttons (not shown) on the sides and other parts.

Further, the controller 30 may also has a steering wheel, a controller for a striking instrument (for example, reference sign 30C in FIG. 1), a microphone, a touch panel display, and an acceleration sensor.

[2] Game Main Unit

Figure 2:
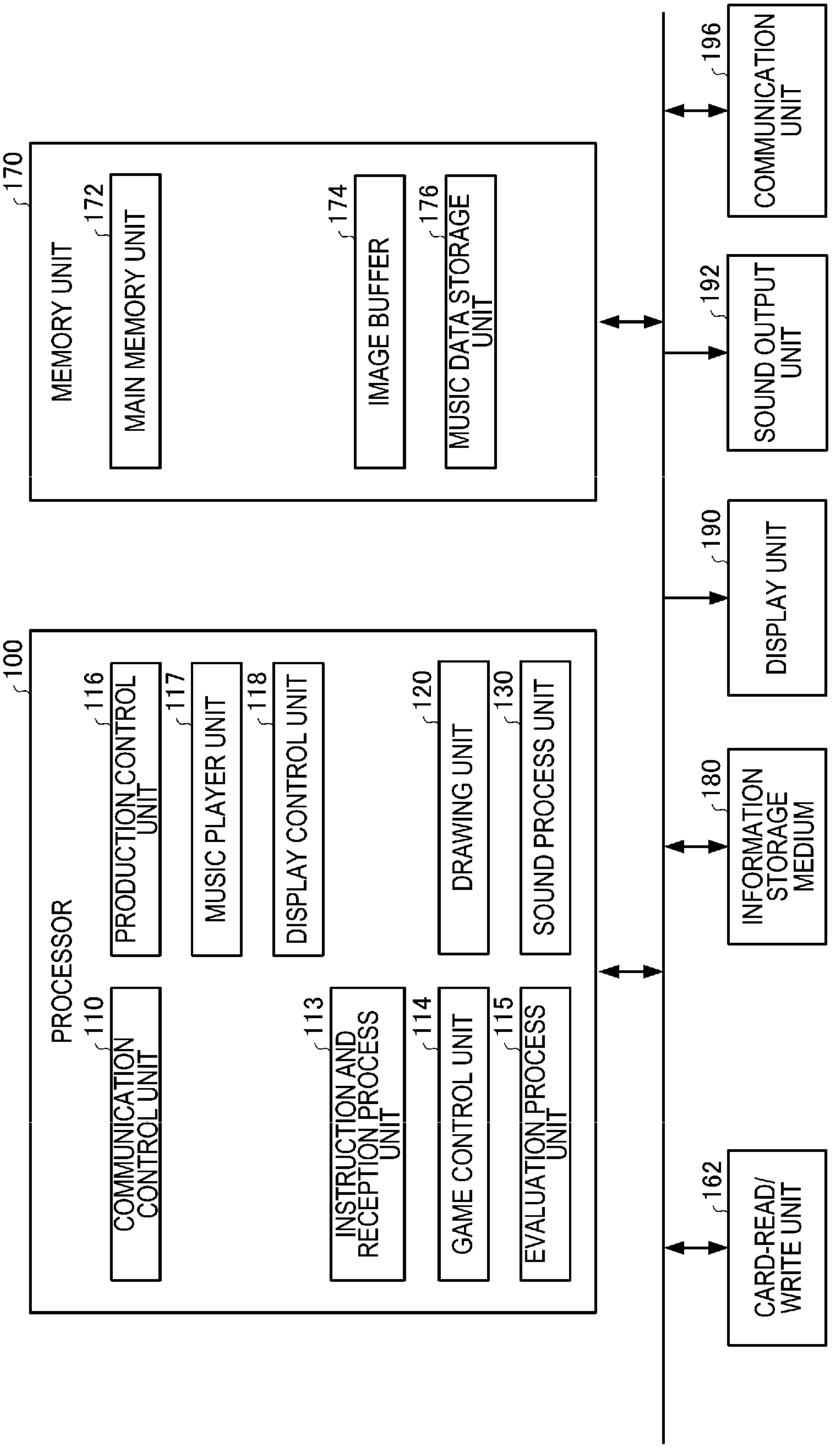
FIG. 2 is an example of a functional block diagram illustrating a game main unit according to one embodiment of the present invention.

Next, the configuration of the game main unit 10 of the present embodiment will be described with reference to FIG. 2. FIG. 2 is an example of a functional block diagram of the game main unit 10 according to the present embodiment.

The game main unit 10 of the present embodiment may be configured by omitting one or more components shown in FIG. 2.

The card-read/write unit 162 reads data from the game card and writes the data to the game card, based on control of the processing section 100.

The memory unit 170 stores predefined programs and data and serves as a work area for the processor 100 and the communication unit 196 and the like. The memory unit 170 temporarily stores the calculation results performed by the processing section 100 in accordance with various programs and input data inputted from the controller 30. The function of the memory unit 170 can served by) and the like.

The memory unit 170 includes a main memory unit 172, an image buffer 174, and a music data storage unit 176.

The main memory 172 stores: a system program for realizing various functions to have the processing section 100 control the game system S in an integrated manner; a game program that necessary performs a rhythm battle game; various data including image data such as characters musical scores; and the like.

The music data storage unit 176 stores music data to be a task of the rhythm battle game, and musical score data that defines timings indicate the operation inputs of each of the players along each of the music data, and operation contents.

The music data includes, in addition to sound source data, bibliographic data such as singers, lyricists and composer, difficulties and levels, and information indicating delimiters such as a bar, a verse, a bridge or a chorus and the like.

The musical score data includes timing at which an operation is inputted by the player along the music data, and musical note information indicating a content (operation content of the musical instrument) indicating a type of operation to be input (for example, when the musical instrument is a Japanese drum, a face strike, a border strike, a continuous face strike, and the like).

The musical data score is formed in advance by arranging the musical note objects at positions of the musical notes of musical score, the musical note object (operation timing objects described later) being extracted from the musical notes of the actual musical score of the corresponding music with the contents of the musical note corresponding to characteristic sound in the music.

In the information storage medium. 180 (a computer-readable medium), programs, data, and the like, are stored. The functions of the information storage medium 180 are implemented by hardware such as an optical disc (CD or DVD), magnetic optical disc (MO), magnetic disc, hard disc, magnetic tape, or memory (ROM).

In the information storage medium 180, a program for causing a computer to function as each unit of the present embodiment (a program for causing the computer to execute the process of each unit) can be stored.

The information storage medium 180 may store the various data such as the system program for realizing various functions to have the processor 100 control the game system S in an integrated manner, a necessary game program that performs the rhythm battle game and music data and the like, similar to the memory unit 170, or instead of the memory unit 170, with the memory unit 170.

A display unit 190 displays a given image generated by the present embodiment. The function of the display unit 190 can be implemented by a CRT, an LCD, a touch panel type display, or an HMD (head mounted display) and so on. The display unit 190 serves as the display 40 in FIG. 1.

A sound output unit 192 outputs a sound that is generated by the present embodiment. The function of the sound output unit 192 can be implemented by a speaker, a headphone and the like.

A communication unit 196 performs the various control to communicate with an external device (for example, a terminal, such as other game system S or a communication terminal including a smartphone, a server 1 and so on) via a network N. The functions of the communication unit 196 can be implemented by hardware of various processors or ASICs for communication, program and so on.

The programs and the data for making the computer function as the units of the present embodiment that are stored in the information storage medium 180 or memory unit 170 of the server device 1 may be received via the network, and be stored in the information storage medium 180 or memory unit 170. The case in which the terminal is made to function by receiving the program or data in this manner is also included within the scope of the present invention.

The communication unit 196 executes various controls for communication (for example, Near Field Communication) with one or more controllers 30.

The communication unit 196 includes an antenna and a wireless module, and transmits and receives the data with the one or more controllers 30 using, for example, Bluetooth (Registered Trademark) technology.

For example, the communication unit 196 transmits sound data, such as confirmation and sound effect sounds, and vibration signals to the controller 30, and receives information (acceleration vector values, etc.) detected by acceleration sensors and input operations at the controller 30 at alternating intervals of 4 msec and 6 msec.

The processor 100 performs processing game process, image generation process, sound generation process, and so on, based on input data and programs from the controller 30 or the card-read/write unit 162.

In particular, the processor 100 performs various processes using the main memory 172 in the memory unit 170 as a work area Further, the processor 100 is implemented by hardware such as various processors (CPU, DSP, etc.), ASICs (gate arrays, etc.), and programs, and performs various functions.

The processor 100 is configured to perform the various processes of the present embodiment or the various functions for the rhythm battle games based on programs (data) stored in the memory unit 170 or information storage medium 180.

Specifically, the processor 100 includes a communication control unit 110, an instruction and reception process unit 113, a game control unit 114, an evaluation process unit 115, a production control unit 116, a music player unit 117, a display control unit 118, a drawing unit 120, and a sound process unit 130. Note that one or more of these units may be omitted from the configuration.

The communication control unit 110 processes data transmission and reception via a network with the server device 1 and terminal devices such as other game systems.

Specifically, the communication control unit 110 performs processes for receiving various information transmitted from the server device 1 and other game system S and for transmitting the information to the server device 1 and other game system S when playing the multiplayer came based on information received from the server device 1 or when playing against other players via a network.

In the game system S of the present embodiment, the communication control unit 110 acquires the network information required for communication control from the server 1 and manages the communication control.

For example, the game system S may acquire identification information for terminal devices (ID that is individually assigned to identify terminals in order to participate in online games) that is individually assigned to each game system S, and destination information that specifies the destination of packet transmission (such as IP address) that is associated with the identification information of each game system S. Further, the game system S may manage the identification information for terminal devices and the destination information.

Specifically, the communication control unit 110 performs: a process that generates the packets to be sent to other terminal devices or server 1; a process that specifies the IP address and the port number of the packet transmission destination terminal device or server 1; a process that stores data contained in received packets in the memory unit 170, a process that analyzes received the packets; and other control processes related to the transmission and reception of packets.

The communication control unit 110 transmits and receives the data to and from a plurality of other game systems S or the server 1 in a predetermined cycle (for example, one second cycle) from the time a communication connection that is established until the communication connection is terminated.

In the case of a network system including the terminal devices of the plurality of game systems S, the communication control unit 110 may execute communication control using the peer-to-peer (so-called P2P) method, in which online games are executed while transmitting and receiving data between a plurality of terminal devices. In the case of a network system including a plurality of terminal devices, communication control unit 110 may execute communication control using the client-server method, in which each terminal device executes an online game while sending and receiving data (information) via the server 1.

In the network system of the present embodiment, the data may be transmitted and received not only by wired communication but also by wireless communication.

The communication control unit 110 performs the process of acquiring input information from the controller 30. For example, the communication controller 110 receives an operation input of the player based on the operation input timing.

The instruction and reception process unit 113 performs recognition process of instruction commands based on input information inputted to the controller 30 by the player.

Specifically, the instruction and reception process unit 113 in the present embodiment recognizes instruction commands inputted by the player, based on the type of button, a number of button presses, the direction of a lever indication, the timing of button pressing down and a lever indication timing, and combinations of these input by the input unit 260.

The instruction and reception process unit 113 recognizes as a special instruction when putting the player's input operation by a plurality of buttons simultaneously, or when inputting the player's input operation by a combination of a camera or an inclination angle the joystick 32 and each of the buttons.

The game control unit 114 performs a process related to the progress of the rhythm battle game. For example, the game control unit 114 performs: the process of starting a game when the game start conditions are (hereinafter also referred to as "game start process"); the process related to the progress of the multiplayer battle game includes: the game control process to control the progress of the rhythm battle game by controlling the player character in response to the player's input operation; and the game end process to terminate the game when the game end condition is met (hereinafter also referred to as "game end process").

When the rhythm battle game is executed by a plurality of players, the game control unit 114 controls moving, for each player, a first game object (hereinafter referred to as "marker object for determining operation input timing") that is used to determine a timing for operation input of each player, a second game object (hereinafter referred to as "operation timing object") indicating the operation input timing of each player, or both objects, along music data played by the music player 117.

Specifically, the game control unit 114 control moving the marker object for determining operation input timing along the music data based on the musical score data so that display positions of the marker objects and the operation timing object match each other at a predetermined reference timing.

When a plurality of players execute a rhythm battle game, the game control unit 114 performs, for each player, display range control process for controlling a display range including movement of an operating-system object formation area associated with each player, the operating-system object formation area being an area in which the marker objects and the operation timing objects are formed for each player.

The game control unit 114 performs these processes every frame (for example, 1/60 second). The frame is the unit of time in which the object movement and action process and image generation process are performed.

The evaluation process unit 115 performs, for each player, evaluation process for evaluating each player on the basis of the received player operation input timing and a given relationship between the marker object for determining operation input timing and the operation timing object.

The production control unit 116 controls a given production for the operating-system object formation area based on the execution result of the display range control process.

The music player unit 117 is a unit to reproduce the music data read into the music data storage unit 176 and output the waveforms of continuous musical compositions to the sound output unit 192.

The functions of the music player unit 117 can realized by hardware such as an integrated circuit (sound source IC) configured to generate waveforms of music sounds, programs, and the like.

Display control unit 118 controls the display of display objects displayed on the display unit 190.

Specifically, the display control unit 118 performs other display control such as generating the display objects (game characters, backgrounds, buildings, a ground surface and the like), indicating the display positions of display objects, and disappears the display objects.

In other words, the display control unit 118 registers the generated display objects in the display object list, transfers the display object list to the drawing unit 120, deletes the disappeared display objects from the display object list.

In particular, when the rhythm battle game is performed by a plurality of players, the display controller 106 causes the drawing unit 108 to draw a part or all of the operating-system object formation areas formed in the display areas of each player, based on the display area of the display unit 190.

The display control unit 106 also causes the drawing unit 108 to draw, for each player, the marker object for determining operation input timing, the operation timing object, or both objects that are controlled to move along the music data played by music player unit 117 in the displayed operating-system object formation area.

The display control unit 118 displays information regarding the game of the corresponding player, as player information, in a blank area generated by the movement of the operating-system object formation area of each player.

The drawing unit 120 is configured to execute a process of drawing (generating) an image based on various processes (game processes) performed by the process unit 100 and output the drawn image to the display unit 190. The function of the drawing unit 120 can be realized by hardware such as the drawing processor (GPU), a program or the like. The drawing unit 108 draws a so-called two-dimensional image or a three-dimensional image.

Specifically, the drawing unit 120 reads out the display object according to the display object list transferred by the display control unit 118 from the main memory unit 172 and the like, and draws the display object in an image buffer 174 (buffer such as a frame buffer or an intermediate buffer VRAM) capable of storing image information in units of pixels.

The drawing unit 120 updates the image information every frame for example, 1/30 seconds) to cause the display unit 190 to display a moving image.

In particular, the drawing unit 120 reads out a score image corresponding to the music data to be played by the music player 117, from the main memory unit 172 in accordance with playing the music data, and draws the score image in the image buffer 174.

The sound controller 130 performs the sound process based on the results of various processes performed by the processor 100, generates a game sound, such as a BGM, an effect sound, or a voice, and outputs the image to the display section 192.

[3] Method of the Present Embodiment.

[3.1] Outline

Next, the technique of the game control process including the movement control of the operating-system object and the display range control of the operating-system object formation area in the rhythm battle game according to the present embodiment will be described with reference to FIGS. 3A and 3B.

Figure 3A:
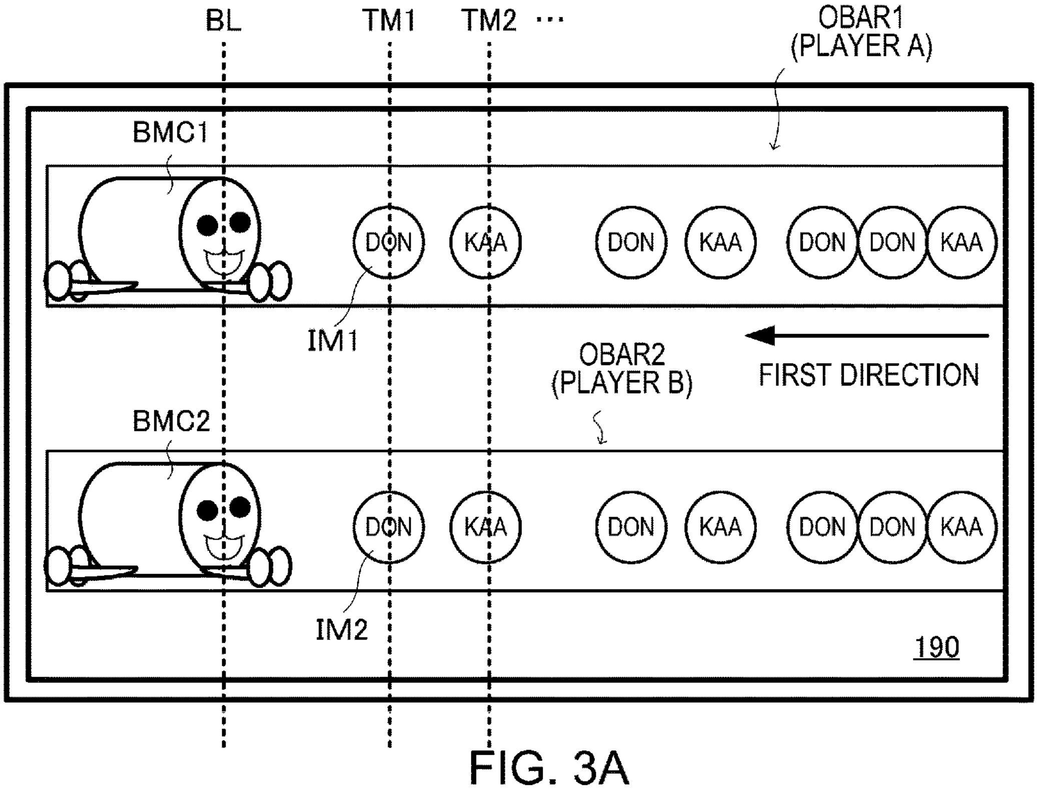
FIG. 3A is a diagram for explaining a game control process that includes movement control of an operating-system object and display range control of an operating-system object formation area in a rhythm battle game according to the embodiment of the present invention.
Figure 3B:
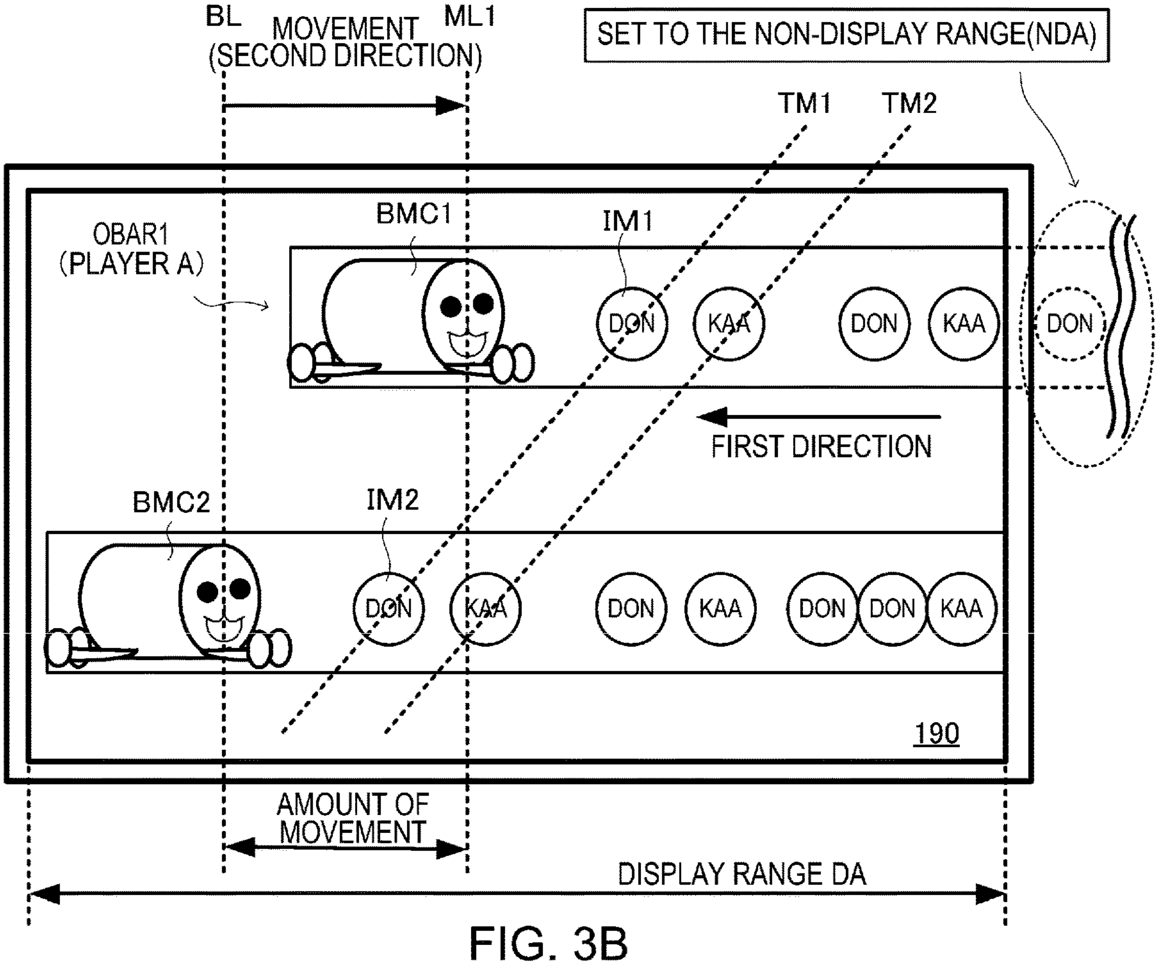
FIG. 3 B is a diagram for explaining a game control process that includes movement control of an operating-system object and display range control of an operating-system object formation area in a rhythm battle game according to the embodiment of the present invention.

FIGS. 3A and 3B are a diagram for explaining a game control process that includes movement control of an operating-system object and display range control of an operating-system object formation area in a rhythm battle game according to the embodiment of the present invention.

The game system S according to the present embodiment is configured to, during playing specific music data such as music set in a player, perform a rhythm battle game for competing among a plurality of players by evaluating operation input timings inputted by each of the players in accordance with the played music.

Especially, the game system S according to the present embodiment is configured to: adjust operation reaction time for the player by controlling a display period of a marker object for determining operation input timing (the first game object) or operation timing object (the second game object) in accordance with the result of the evaluation process; and allow the player itself and other players to visually recognize the results of the evaluation process.

Specifically, during playing the specific music data, the game system S performs:

(A1) a display range control process of controlling a display range of an operating-system object formation area associated with each of the players, the operating-system object formation area being an area in which the mark object for determining an operation input timing and the operation timing object of each of the players are formed;

(A2) an operation-system object movement control process of performing at least one of: a movement control process of moving the operation timing object in a first direction and a movement control process for moving the mark object for determining operation input timing in a second direction that is a direction opposite to the first direction; and (A3) an evaluation process of evaluating each player based on an operation input when a player's operation input is received (specifically, the operation input timing), and given relationship between the mark object for determining an operation input timing and the operation timing object at the operation input timing (for example, a timing relationship or a positional relationship within the operating-system object formation area).

As the display range control process of (A1), the game system S is configured to move, in a second direction that is a direction opposite to the first direction, the corresponding operating-system object formation area including the mark object for determining operation input timing and the operation timing object in accordance with the evaluation of the evaluation process; and set at least a part of the operating-system object formation area to the non-display range (i.e., the non-display range).

For example, as illustrated in FIG. 3A, when the evaluation of the player A increases as a result of the evaluation process of the player A and the player B participating in the game, the game system S moves the operating-system object formation area OBAR1 corresponding to the player A, as illustrated in FIG. 3 B, by a predetermined movement amount, toward a non-display area that cannot be displayed by the display unit 190, the non-display area being a direction opposite to a movement direction (i.e., the first direction) of the operation timing object IM.

FIGS. 3A and 3B, indicate that:

(B1) the operation system object formation area ° BARI of the player A (that is, the position of the reference timing BL) has moved in the second direction to the first movement position ML1 by high evaluation, and the position of the operating-system object formation area OBAR2 of the player B has not moved by the lack of high evaluation (fixed to the position of the reference timing BL);

(B2) the part area of the operating-system object formation area OBAR1 that corresponds to the player and is displayed in the display range DA by moving the operating-system object formation area (MARL has been set to the non-display range NDA; and (B3) the evaluations of the same operation timing object IM are determined by each player at the same timing, when the operating-system object formation area OBAR1 moves, and when there is no change in the timings (TM1 and TM2) at which the operation timing object IM reaches the corresponding mark object for determining operation input timing BMC.

Based on this configuration, when the display range is narrowed by moving the operating-system object formation area, in the present embodiment, the display period of the operation timing object can be shortened, and the time from player reaction to player operation (hereinafter, referred to as "operation reaction time") can be shortened.

Therefore, in the present embodiment of the present invention, the difficulty of the game by controlling the operation reaction time can be adjusted with maintaining game enjoyment based on the timing of operation inputs. Further, in the present embodiment a production for livening up the battle game performed by a plurality of the players, can be provided. Therefore, in the present embodiment, the interest of the game (in particular, the interest of the multi-play game) can be improve.

The description is given using a music rhythm game in which the player is operated in accordance with a sound or rhythm such as a music game (so-called sound game) and the accuracy of the operation input timing of the player is evaluated. In addition to evaluating the operation timing of the player, any game that evaluates the accuracy of the operation input of the player regardless of the timing is applicable.

[3.2] Basic Principles of the Operating-System Object Movement Control Process

Figure 4A:
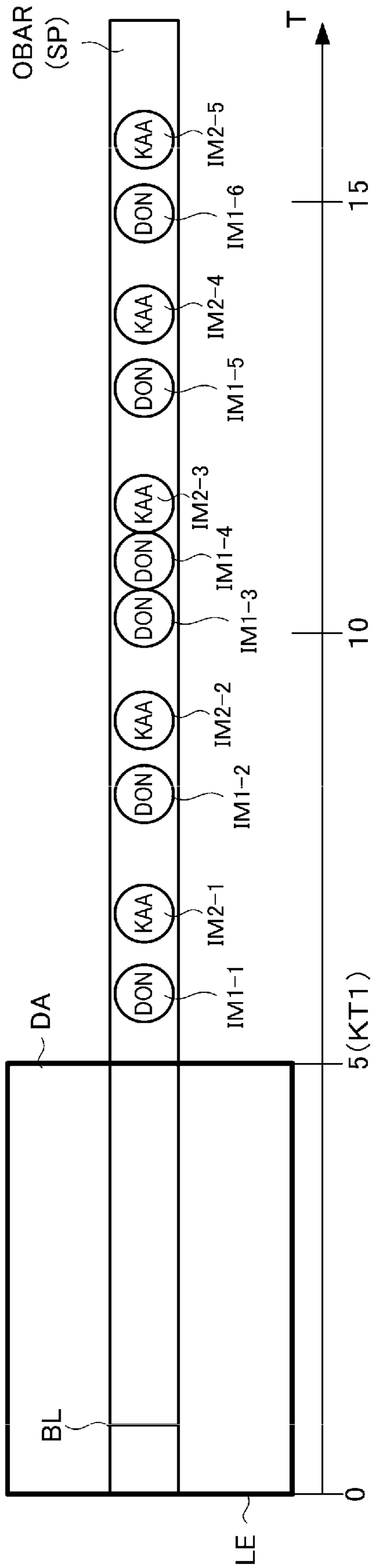
FIG. 4 A is a diagram for explaining the basic principle of the operating-system object movement control process according to the embodiment of the present invention.

Next, the operating-system object movement control process according to the present embodiment will be described with reference to FIGS. 4A, 4B, and 4C. FIGS. 4A, AB and 4C are diagrams for explaining the basic principle of the operating-system object movement control process according to the embodiment of the present invention.

The game control unit 114 forms the operating-system object formation area for each player participating in the rhythm battle game, and controls moving the mark object for determining operation input timing and the operation timing object formed in the operating-system object formation area.

In other words, the game control unit 114 displays, during the game, the operating-system object formation area for each player in a game screen on the display unit 190, and controls moving the mark object for determining operation input timing and the operation timing object on the basis of musical score data along the music data.

In particular, the game control unit 114 controls moving the operation timing object that indicates content of an operation inputted by the player with the mark object for determining operation input timing, while working with the movement control (display range control) of each operating-system object formation area, with reference to a fixedly arranged position of the mark object for determining operation input timing which is a reference for operation input timing and which is an object for determining an operation timing.

Specifically, the game control unit 114 forms, as one of initial settings, the operation system object formation areas that are formed extending from one end of a display range of the number of players participating in the rhythm battle game toward the other end on the opposite side, in a game space (a space for configuring a game screen including a display range and a non-display range to be displayed on the display unit 190), and arranges a circular mark object for determining operation input timing on one end side (for example, the left side) in each of the operation system object formation areas.

When the game is started, the game control unit 114 moves, for each operation-system object formation area, a plurality of operation timing objects that has different operation types (for example, different operation input contents) at a constant speed in a first direction from the second end side to the first end side (for example, toward the mark object for determining operation input timing), in keeping with the operation-system object formation area along the musical score data based on the music data.

The mark object for determining the operation input timing of each player is fixedly arranged in the operating-system object formation area, and when the operating-system object formation area is moved by the display range control process, the mark object moves in accordance with the movement. Although the mark object for determining the operation input timing of each player is visually moved by the display range control process, there is no relative change in position in the operating-system object formation area.

Figure 4B:
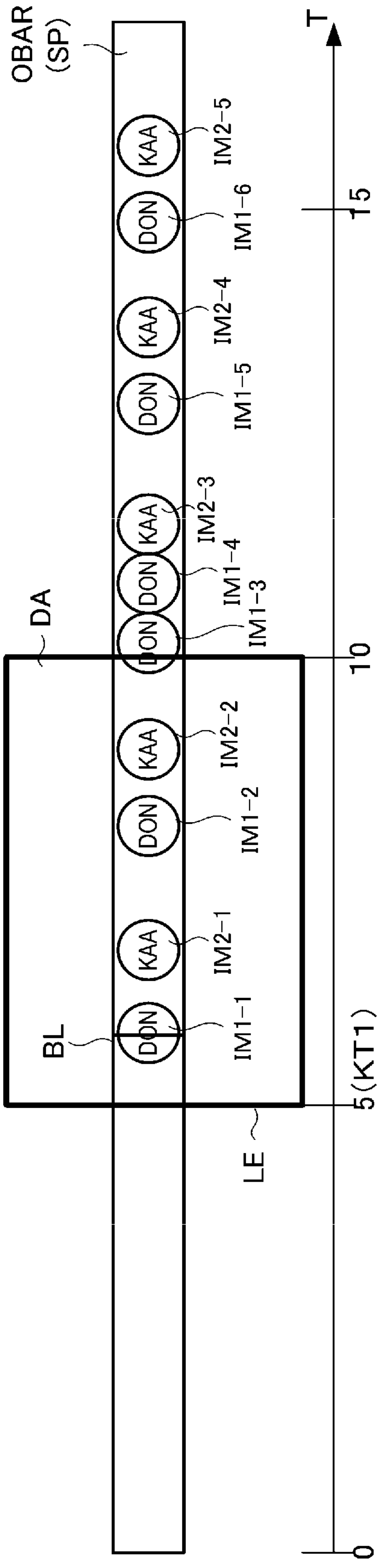
Figure 4C:
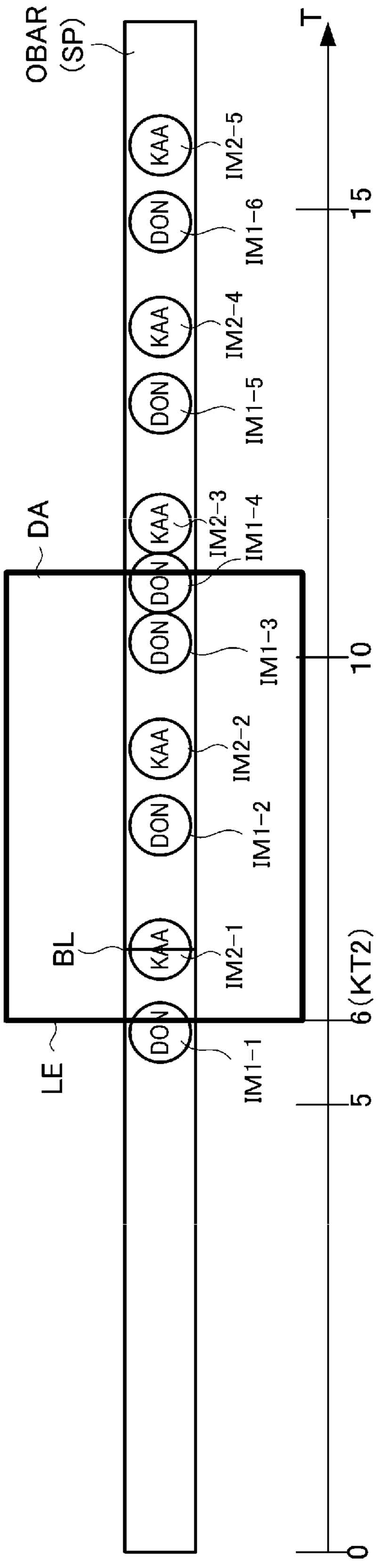

For example, as illustrated in FIGS. 4A, 4B and 4C, the game control 114 works with the display control 118 and forms, at the time of initialization (for example, the music data is not being played, that is, before playing the music data is started), a horizontally long score image (an image of the operation-system object formation area OBAR formed including the display range and the non-display range) SP with reference to the mark object for determining operation input timing (the position of the reference timing 131, in the figure).

As illustrated in FIGS. 4A, 4B, and 4C, when starting playing the music data by the music player unit 117, the game control unit 114 works with the display control unit 118 and moves, from right to left in the figure as the time T elapses, the plurality of first operation timing objects IM1-1 to IM1-*n* (n is a natural number) and the plurality of second operation timing objects IM2-1 to Im2-*n* at a constant speed on the operating-system object formation area OBAR, with a fixed position of the mark object for determining operation input timing in the display range DA (that is, the position of the reference timing BL).

In particular, when the reference timing KT1 corresponding to the first operation timing object IM1-1 arrives, the game control unit 114 controls the movement of each of the operation timing objects 1M in the first direction so that the first operation timing object IM1 moves to the position of the mark object for determining operation input timing.

In FIGS. 4A, 4B, and 4C, the range displayed on the display unit 190 is illustrated as the display range DA, and in the example described above, the display control unit 118 causes the display unit 190 to display a part of the range as the display range DA with reference to the mark object for determining operation input timing.

In the above-described FIGS. 4A, 4B, and 4C, although the display range DA moves from left to right in the figure over time, in an actual game, the musical score image SP moves from right to left in the figure, as described above.

The above description with reference to FIGS. 4A, 4B, and 4C is an example of description in a case where the display range control process is not executed in a single play.

In particular, in the operating-system object movement control process similarly to the plurality of players, the operating-system object movement control process is performed on each player in the same manner as in the above example. The operating-system object movement control process in such a case of the plurality of players is not different from each other, but is performed at the same timing in a completely linked manner.

In other words, as described later, the mark object for determining operation input timing and the operation-system object formation area for restricting the movement range of the operation timing object also move through the display range control process. The game control unit 114 controls, at the same timing, the timing at which the same operation timing object arrives at the mark object for determining operation input timing in each player.

The game control unit 114 may move the mark object for determining operation input timing in a second direction opposite to the first direction from the first end side to the second end side (that is, toward the operation timing object) at a constant speed.

In this case, the game control unit 114 fixedly arranges the operation timing objects in the operating-system object formation area.

The game control unit 114 may move the operation timing object in the first direction at a constant speed, and move the mark object for determining operation input timing in a second direction opposite to the first direction from the first end side to the second end side (that is, toward the operation timing object) at a constant speed.

[3.3] Evaluation Process

Next, the evaluation process of the present embodiment will be described using FIGS. 5A to 8. FIGS. 5A to 8 are diagrams for explaining evaluation process of the present embodiment.

(Basic Principle of Evaluation Process)

The evaluation process unit 115 performs, as evaluation process, for each player, the evaluation process for determining an evaluation of each player in the rhythm music game on the basis of the movement control of the operation timing object and the operation input of each player, with reference to the arrangement position of the mark object for determination of the operation input timing in accordance with the operation-system object movement control process.

In particular, the evaluation process unit 115 performs, for each player, evaluation process of determining the evaluation of each player in the rhythm music game on the basis of the received operation input timing when receiving operation input of the player and a given relationship between the mark object for determining operation input timing and the operation timing object at the operation input timing.

Specifically, the evaluation process unit 115 performs, for each player, the evaluation process (hereinafter referred to as "individual operation timing evaluation process") of a timing at which each movement-controlled operation timing object reaches the position of the mark object for determining the operation input timing (hereinafter referred to as the "individual evaluation timing").

That is, as the individual operation timing evaluation process, the evaluation process unit 115 determines whether the instruction content of each operation timing object has been successfully inputted by the player at a specified timing.

The evaluation process unit 115 performs, for each player and for each given period (hereinafter referred to as "evaluation period"), an evaluation process of each evaluation period (hereinafter referred to as "evaluation process based on the evaluation period") in accordance with the evaluation results of the individual operation timing evaluation process.

For example, the evaluation process unit 115 evaluates, as the evaluation process, each player by changing parameters such as scores based on the number of successes, the number of failures, the timing match, and the number of consecutive successes (so-called combo numbers) of the specified operation input.

(Individual Operation Timing Evaluation Process)

As the individual operation timing evaluation process, the evaluation process unit 115 determines whether the operation result of the player has given conditions as an evaluation result at the individual operation timings (hereinafter referred to as "evaluation conditions"), and uses the result as the result of the evaluation process.

Specifically, for each player, the evaluation process unit 115 compares the operation timing object when receiving the player's operation input and a timing at which the operation timing object arrives at the mark object for determining operation input timing at the operation input timing in the operation-system object formation area, and performs evaluation process based on the result of the comparison.

The evaluation process unit 115 use, as a given evaluation condition, that:

(A1) the input of the operation content indicated by the operation timing object succeeds;

(A2) the timing of the operation inputted 1*w* the player and the given relationship between the mark object for determining an operation input timing and the operation timing object at the timing of the operation input fulfills a predetermined success condition; and (A3) both of (A1 and (A2) are satisfied.

In particular, the evaluation process unit 115 may use a plurality of any one of (A1) to (A3) as the evaluation condition, and in this case, it is preferable that the establishment condition is set (easy to establish, difficult to establish, or the like) for each evaluation condition, and that evaluation values such as points are set stepwise according to the establishment condition.

In other words, the evaluation process unit 115, when a plurality of conditions that has (A3) condition and provides stepwise evaluation values are used as the evaluation conditions, and when a first condition in which an establishment condition is strict is satisfied, provides a first point (a relatively high point, for example, 5 points). On the other hand, in this case, when a first condition is not satisfied and a second condition looser than the first condition is satisfied, the evaluation process unit 115 provides a second point (a relatively low point, for example, 1 point) lower than the first point.

Figure 5A:
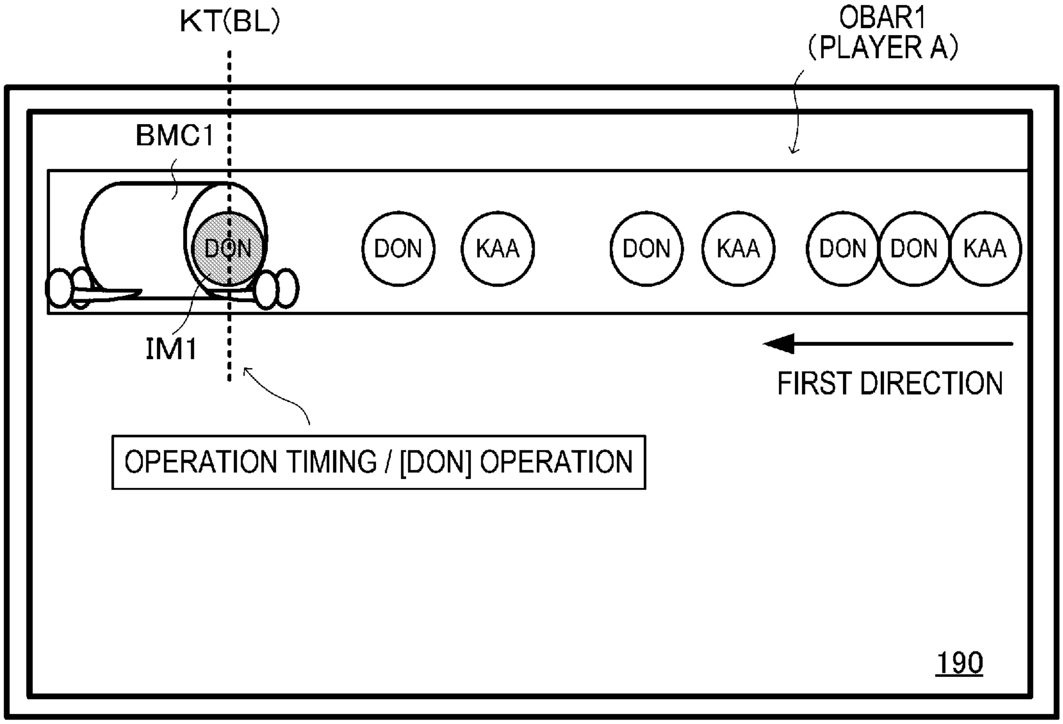
FIG. 5 A is a diagram for explaining evaluation process of the one embodiment of the present invention embodiment of the present invention.

For example, as illustrated in FIG. 5A, the evaluation process unit 115 provides the relatively high point (e.g., 5 points) to the corresponding player: when the reference timing KT (e.g. Five seconds after the start of playing the music), at which the first operation timing object IM1-1 arrives at the position of the mark object for determining operation input timing (e.g., a position of the reference timing BL when the display range control process is not performed), matches the operation input timing of the controller 30 of the corresponding player; and when the operation content (the operation indication for inputting "don") indicated by the first operation timing object IM1 matches the content of operations in the controller 30 of the corresponding player.

Figure 5B:
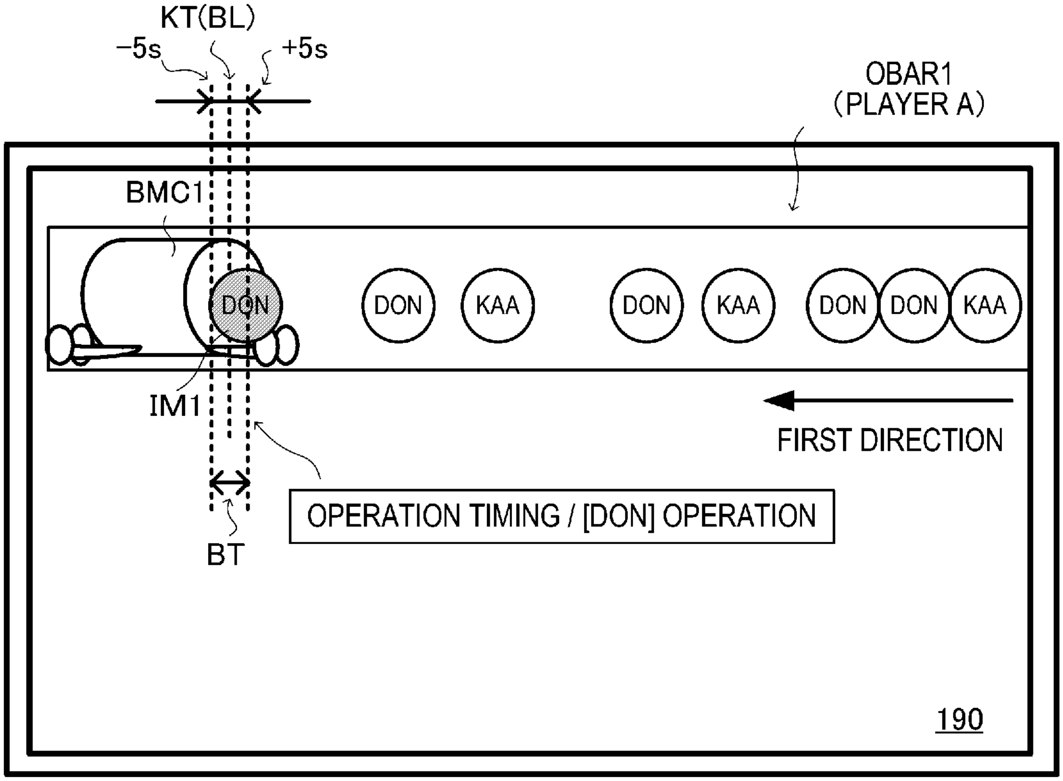

As illustrated in FIG. 5 B, the evaluation process unit 115 provides a relatively low point (i.e., one point) to the corresponding player: when the reference timing KT and the operation input timing are not exactly the sale (not perfectly the same); and when the first operation timing object IM1 arrives at a timing other than the reference timing KT and within a period BT (e.g., 0.5 seconds before and after the reference timing), which is a period in which the first operation timing object IM1 passes through the mark object for determining operation input timing BMC1.

Figure 6:
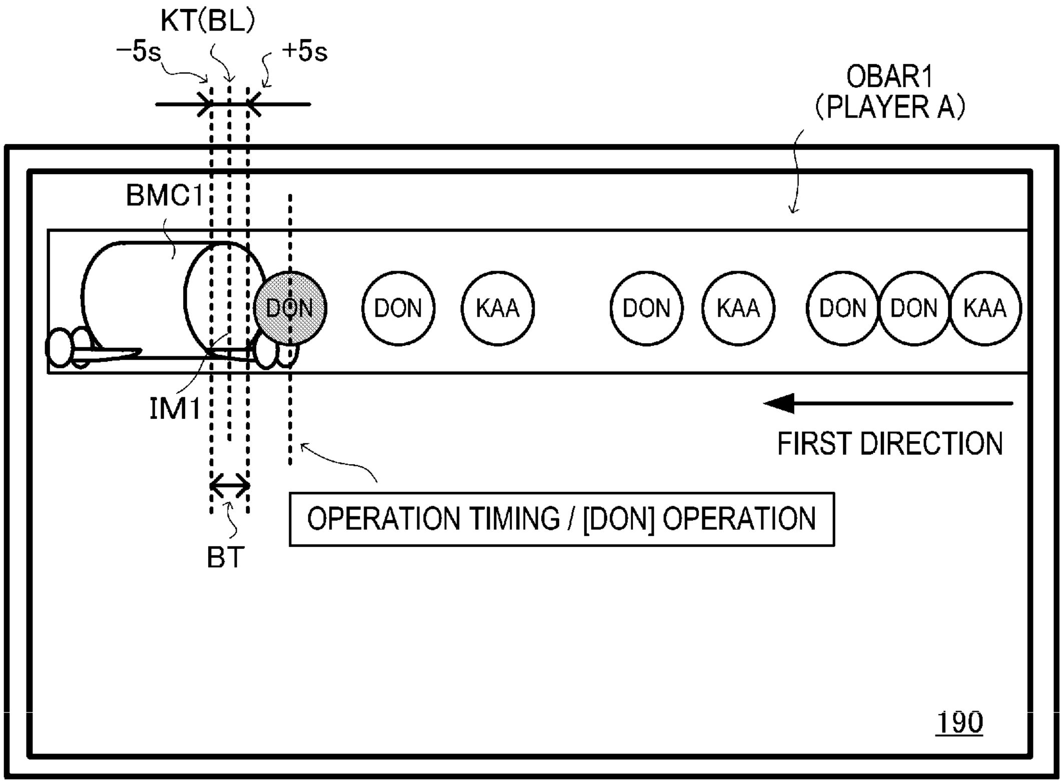
FIG. 6 is a diagram for explaining evaluation process of the one embodiment of the present invention.

As illustrated in FIG. 6, when determined that the reference period BT for the first operation timing object IM1 does not include the operation timing performed by the controller 30 of the player, or that the operation input to the controller 30 is different from the operation content, the evaluation process unit 115 does not provide any points.

The evaluation process unit 115 performs the evaluation process of calculating the points provided to the individual timing as scores for the corresponding players.

Instead of the evaluation process based on the result of comparing the operation input timing with the operation based object arrival timing within the operation based object formation area, the evaluation process unit 115 of the present embodiment performs the evaluation process based on the mark object for determining operation input timing and the operation timing object at the operation input timing for each player, and the positional relationship between the two objects in the operating-system object formation area.

Figure 7A:
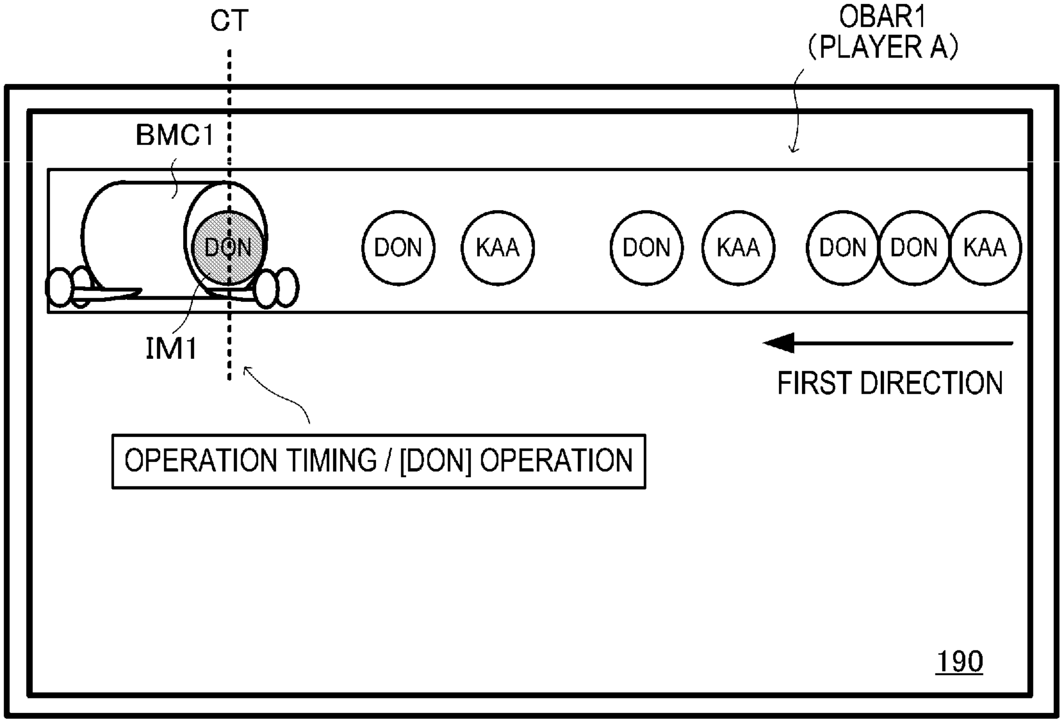
FIG. 7 A is a diagram for explaining evaluation process of the one embodiment of the present invention.
Figure 7B:
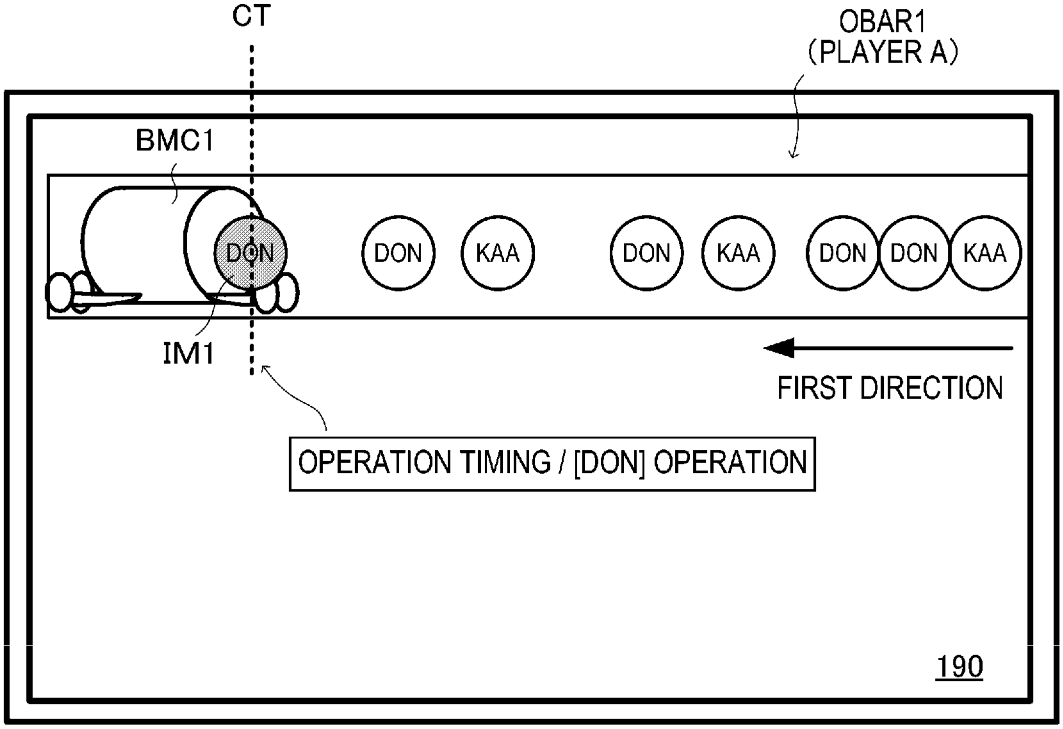
Figure 8:
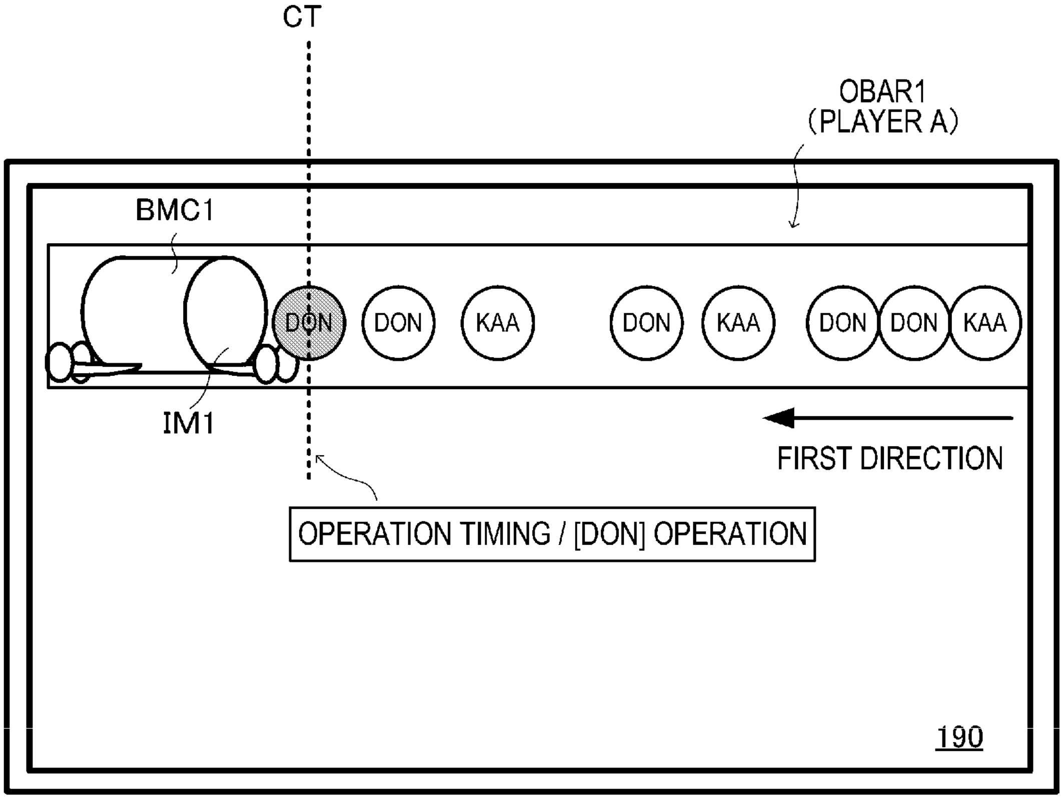
FIG. 8 is a diagram for explaining evaluation process of the one embodiment of the present invention.

In this case, as illustrated in FIGS. 7A and 7B and FIG. 8, the evaluation process unit 115 performs, for each player, a hit check (contact within the operating-system object formation area) between the mark object for determining operation input timing and the operation timing object at the operation input timing when the operation input from the player is received.

The evaluation process unit 115 identifies whether there is a hit or not and the status thereof (that is, whether the objects overlap with each other in the operating-system object formation area, and, in a case where the objects overlap with each other, the areas or the number of pixels overlap with each other), and identifies the status of overlap with each other as an evaluation result.

For example, as illustrated in FIG. 7A, the evaluation process unit 115 provides a relatively high point (i.e., 5 points) to the corresponding player when determining that the operation timing object IM1 hits the mark object for determining operation input timing BMC1 (strictly speaking, the face portion of the character) at the operation timing CT and when the objects completely overlap with each other in the operating-system object formation area.

For example, as illustrated in FIG. 7B, the evaluation process unit 115 provides a relatively low point (i.e., 1 point) to the corresponding player when determining that the operation timing object IM1 hits the mark object for determining operation input timing BMC1 (strictly speaking, the face portion of the character) at the operation timing CT and when the objects do not partially overlap with each other in the operating-system object formation area.

Further, as illustrated in FIG. 8, the evaluation process unit 115 does not provide any point to the corresponding player when determining that the operation timing object IM1 does not hit the mark object for determining operation input timing BMC1 (strictly speaking, the face portion of the character) at the operation timing CT.

Similar to using the timing described above, the evaluation process unit 115 performs the evaluation process of calculating the points provided to the individual timing as scores for the corresponding players.

As a given evaluation condition, the evaluation process unit 115 of the present embodiment use: that the input of the operation content indicated by the operation timing object is successful (hereinafter, also referred to as a "first evaluation condition") and that the timing of the operation input by the player and a given relationship between the mark object for determination of the operation input timing and the operation timing object at the operation input timing have a predetermined success condition (hereinafter, also referred to as "second evaluation condition"). Instead of these, or in addition to these, as the evaluation condition, the evaluation process unit 115 of the present embodiment use that a predetermined parameter such as the score of the player, the number of items acquired by the player and the like satisfies predetermined conditions (hereinafter, also referred to as "third evaluation conditions," and for example, the score becomes a predetermined value).

For example, the evaluation process unit 115 of this embodiment may provide a relatively high point when the first evaluation condition, the second evaluation condition and the third evaluation condition are satisfied, and provide a relatively low point when the first evaluation condition and the second evaluation condition are only satisfied.

Further, the evaluation process unit 115 performs the evaluation process depending on whether only the first evaluation condition is satisfied, only the second evaluation condition is satisfied, or only the third evaluation condition is satisfied.

(Evaluation Process Based on Evaluation Period)

In the case where the evaluation process described above is being performed at each individual operation timing, the evaluation process unit 115 performs evaluations of each player in the corresponding evaluation period for each given evaluation period or after that evaluation period has elapsed.

Specifically, as the evaluation period, the evaluation process unit 115 uses:

(B1) a period of time determined on the progress of the game in the case of the music game, such as a bar, a verse, a bridge or a chorus;

(B2) a period of time during which the event has occurred;

(B3) a period of time from the first timing to the second timing predetermined during playing the game; and (B4) a period of time specified by the player.

The evaluation process unit 115 aggregates the evaluation results of the individual operation timing evaluation process in the evaluation period for each player, for each evaluation period, or after the evaluation period has elapsed. Further, the evaluation process unit 115 identifies the aggregated results as the evaluations of each player. The evaluation process unit 115 may use not only the corresponding single evaluation period for each evaluation period, but also the evaluation results in all the previous evaluation periods.

For example, in the rhythm battle game, the evaluation process unit 115 sums all of the points evaluated at each individual operation timing as scores for each player and each clause, as evaluations in each clause.

The evaluation process unit 115 may use the value obtained by summing the evaluation results, or the statistical numerical value such as an average value or a deviation value.

[3.4] Display Range Control Process

Next, the display range control process according to the present embodiment will be described with reference to FIGS. 9 to 12. FIGS. 9 to 12 are diagrams for explaining the display range control process according to the present embodiment.

As the display range control process, the game control unit 114: moves the corresponding operating-system object formation area including the mark object for determining operation input timing and the operation timing object in a direction (that is, a second direction) opposite to the first direction that is the movement direction of the operation-system object in accordance with the evaluation of the evaluation process; and set at least a part of the operating-system object formation area to the non-display range (i.e., the non-display range) in the display unit 190.

In particular, the game control unit 114 sets, while the mark object for determining operation input timing, the operation timing object, or both of the objects are maintained in a moved state, at least a portion of the operating-system object formation area to the non-display range, and controls the width or narrowness of the display range of the operating-system object formation.

As the display range control process, the game control unit 114 moves at least a part of the operating-system object formation area already set in the non-display range in the first direction in accordance with the evaluation indicating, the result of the evaluation process. The game control unit 114 moves at least a portion of the operating-system object formation area set in the non-display range into a range displayed on the display unit 190 (hereinafter referred to as a "display range").

Specifically, the game control unit 114 determines, for each player, the movement control content of the movement direction and the movement amount of the operating-system object formation area in a given period (hereinafter referred to as an "evaluation reflection period") in accordance with the evaluation in the evaluation period identified by the evaluation process. The game control unit 114 performs a display range control process in which the operating-system object formation area ids moved from the position (current position) in the first direction or the second direction and the position of the operating-system object formation area is maintained during the evaluation reflection period on the basis of the determined movement control content.

The control unit 114 determines, for each player, the movement control content including the movement direction and the movement amount of the operating-system object formation area in the evaluation reflection period on the basis of the score obtained by aggregating points at each individual operation timing in the evaluation period. At the start timing of the evaluation reflection period, the game control unit 114 moves the operating-system object formation area itself on the basis of the determined movement control content, and maintains the position until the evaluation reflection period ends.

At this time, the game control unit 114 may determine the movement control content based on the evaluation value (for example, a score) of each player, which is an absolute value, in the evaluation period, or may determine the movement control content based on values relative to other players.

That is, when the evaluation value of the evaluation period of each player is used as an absolute value, the game control unit 114 refers to table data in which the evaluation value, the movement amount, and the movement direction are determined in advance, and executes movement control of the operation-system object formation area of each player based on the movement amount and the movement direction determined by the table data.

When using the evaluation values in the evaluation period of each player as relative values with respect to other players, the game control unit 114 determines the ranking of the evaluation values of each player. The game control unit 114 differentiates the amount of movement in a direction that is disadvantageous for the player in the game in order from the top, or differentiates the amount of movement in a direction that is advantageous for the player in the game in order from the bottom (so that players with higher ranks are disadvantageous), and executes movement control of the operation-system object formation area of each player.

As the operating-system object movement control process, the game control unit 114 moves, for each player, the operating-system object formation area in which the mark object for determining operation input timing is fixedly disposed and the operation timing object to be moved toward the mark object for determining operation input timing in the second direction, which is a direction disadvantageous to each player, or in the first direction opposite to the second direction, while maintaining the position (relative position) of the mark object for determining operation input timing in the operation-system object formation area.

In other words, when the operating-system object formation area moves by a predetermined amount of movement in a predetermined direction, the game control unit 114 moves the fixed mark object for determining operation input timing and the operation timing and each of the moving operation timing objects by a predetermined amount of movement in the predetermined direction.

The mark object for determining the operation input timing of each player is fixedly installed in the operating-system object formation area, and when the operating-system object formation area is moved by the display range control process, the mark object moves in accordance with the movement. Even when the mark object for determining the operation input timing of each player is moved by the display range control process, there is no relative change in position in the operating-system object formation area, the game control unit 114 moves the operating-system object formation area.

For example, as illustrated in FIGS. 9 to 12, in the rhythm battle game executed by three players, it is assumed: that the display range control process is performed; that the display range control process is a process of moving the operating-system object formation area in a direction disadvantageous to the player (second direction) based on the relative evaluation value of each player in each evaluation period; that each bar in the music data used in the game is defined as an evaluation period; and that a bar continuing following the bar in the evaluation period is defined as an evaluation reflection period.

Figure 9:
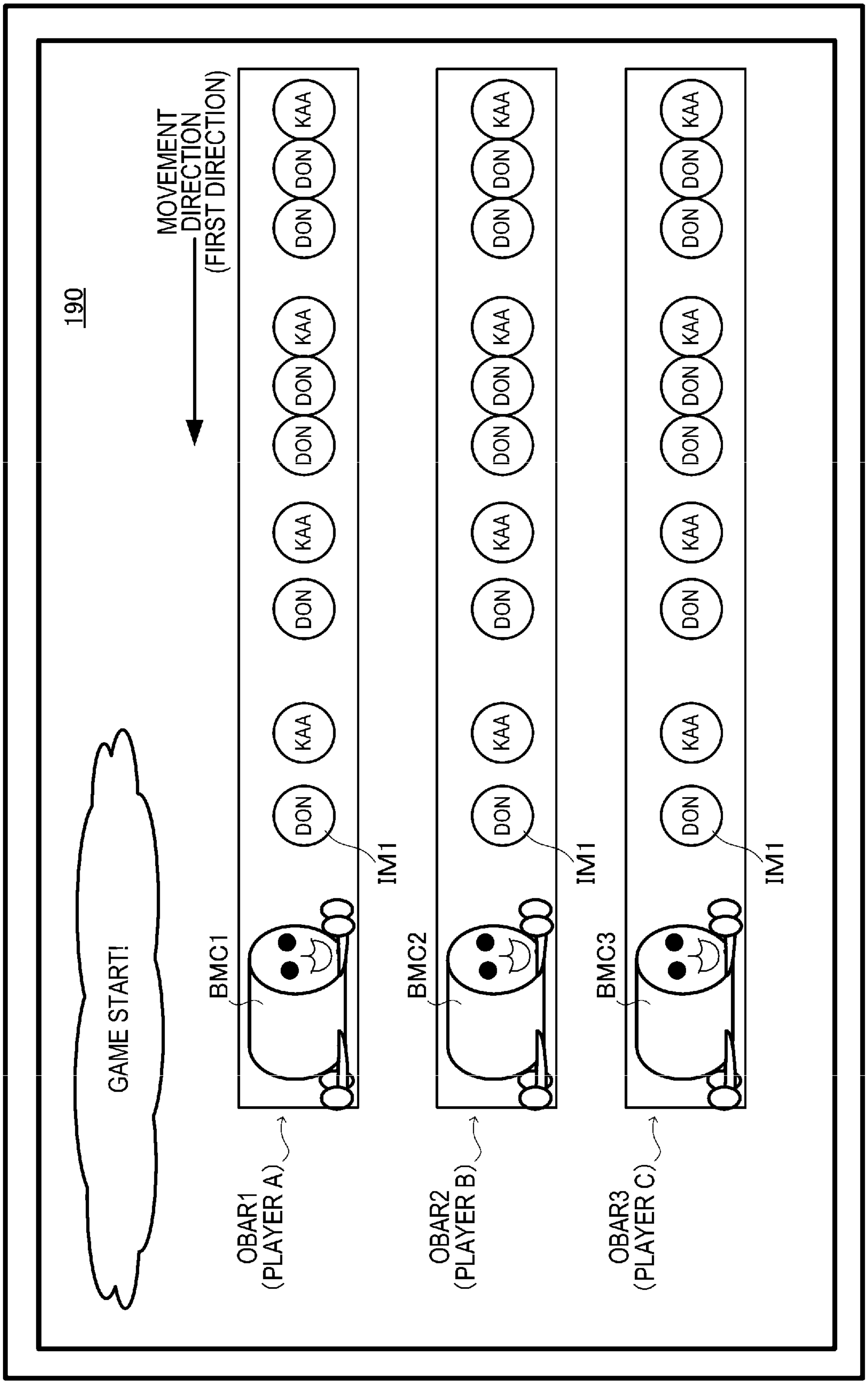
FIG. 9 is a diagram for explaining a display range control process according to the one embodiment of the present invention.

In this case, as illustrated in FIG. 9, for example, it is assumed that the game control unit 114 forms the operating-system object formation area in a state of extending to the left and right of the display range and vertically arranges the operating-system object formation areas OBAR of the players. Further, it is assumed: that the mark object for determining operation input timing BMC of each player is fixedly set to the left end in the figure within the corresponding operation-system object formation area; and that the operation timing object 1M of each player is moving toward the mark object for determining operation input timing BMC (i.e., in a first direction) from the right end of the display unit 190 in the figure.

As illustrated in FIG. 9, at the start of a game, the game control unit 114 arranges the operation-system object formation areas OBAR1, OBAR2, and OBAR3 of the players A, B, and C to be extended in the left-right direction of the display unit 190. The game control unit 114 performs the operating-system object movement control process of moving the operation timing object 1M toward the mark object for determining operation input timing BMC on the basis of the arrangement position.

Figure 10:
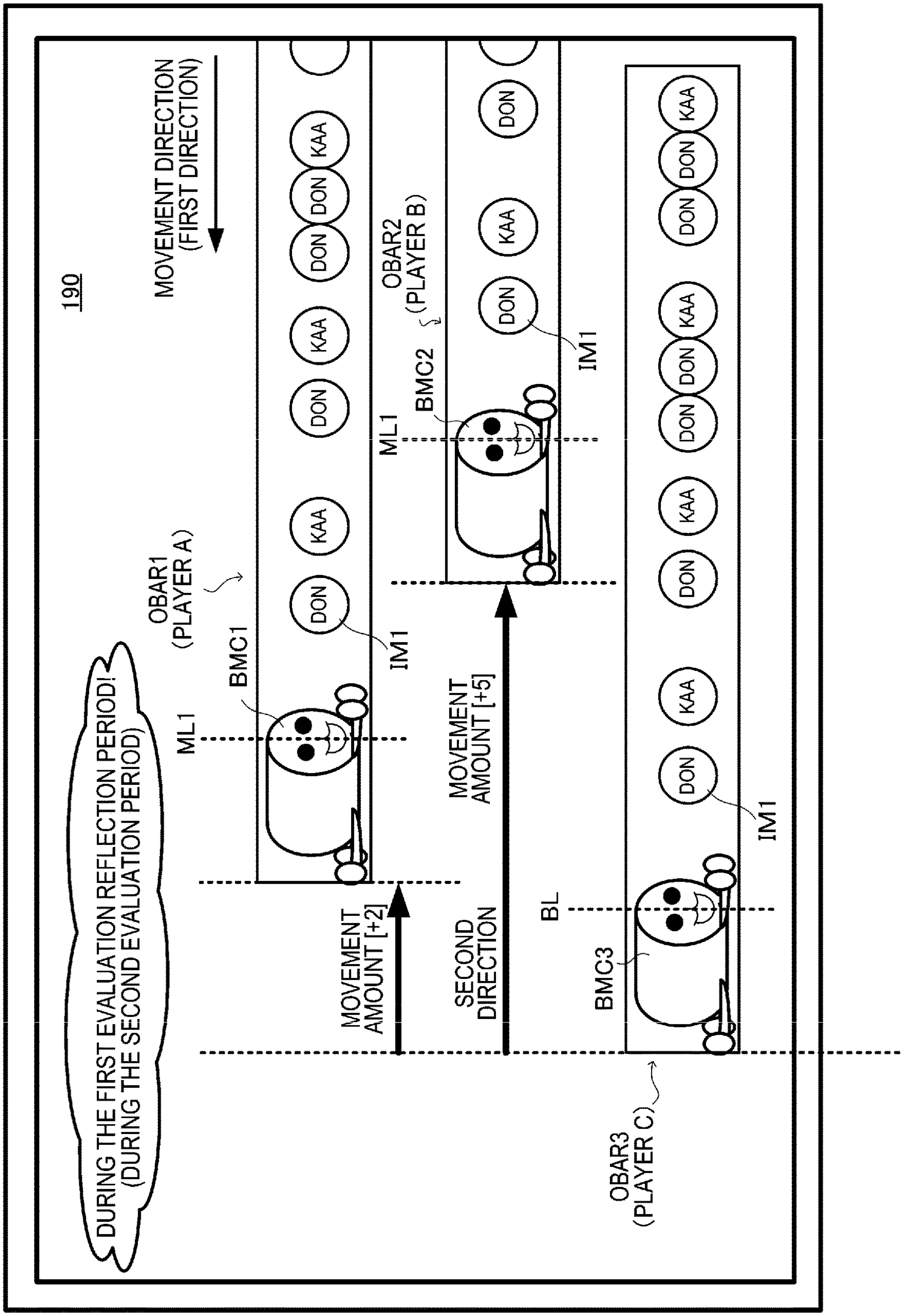
FIG. 10 is a diagram for explaining a display range control process according to the one embodiment of the present invention.

In such a case, as illustrated in FIG. 10, in the first evaluation period, when the evaluation process is performed with the evaluation value of the player A of the second place (total 3 players), the player B of the first place (total 3 players), and the player C of the third place (total 3 players), during a first evaluation reflection period in the first evaluation period, the game control unit 114 performs the display range control process: of moving, "+2" of a predetermined unit amount, the operating-system object formation area OBAR1 of the player A in the second direction; and of moving, "+5" of a predetermined unit amount, the operating-system object formation area OBAR2 of the player B in the second direction by a predetermined unit amount.

In this case, the game control unit 114 maintains the position of the operation-system object formation area OBAR3 of the player C without moving.

Further, by moving each of the operating-system object formation areas OBAR, the reference timing BL for performing the evaluation process moves to the movement position ML1 and the movement position ML2. However, the timing at which each operation timing object IM arrives at each of the movement positions ML1 and ML2 is the same as the timing at which each operation timing object IM arrives at the reference timing BL.

Figure 11:
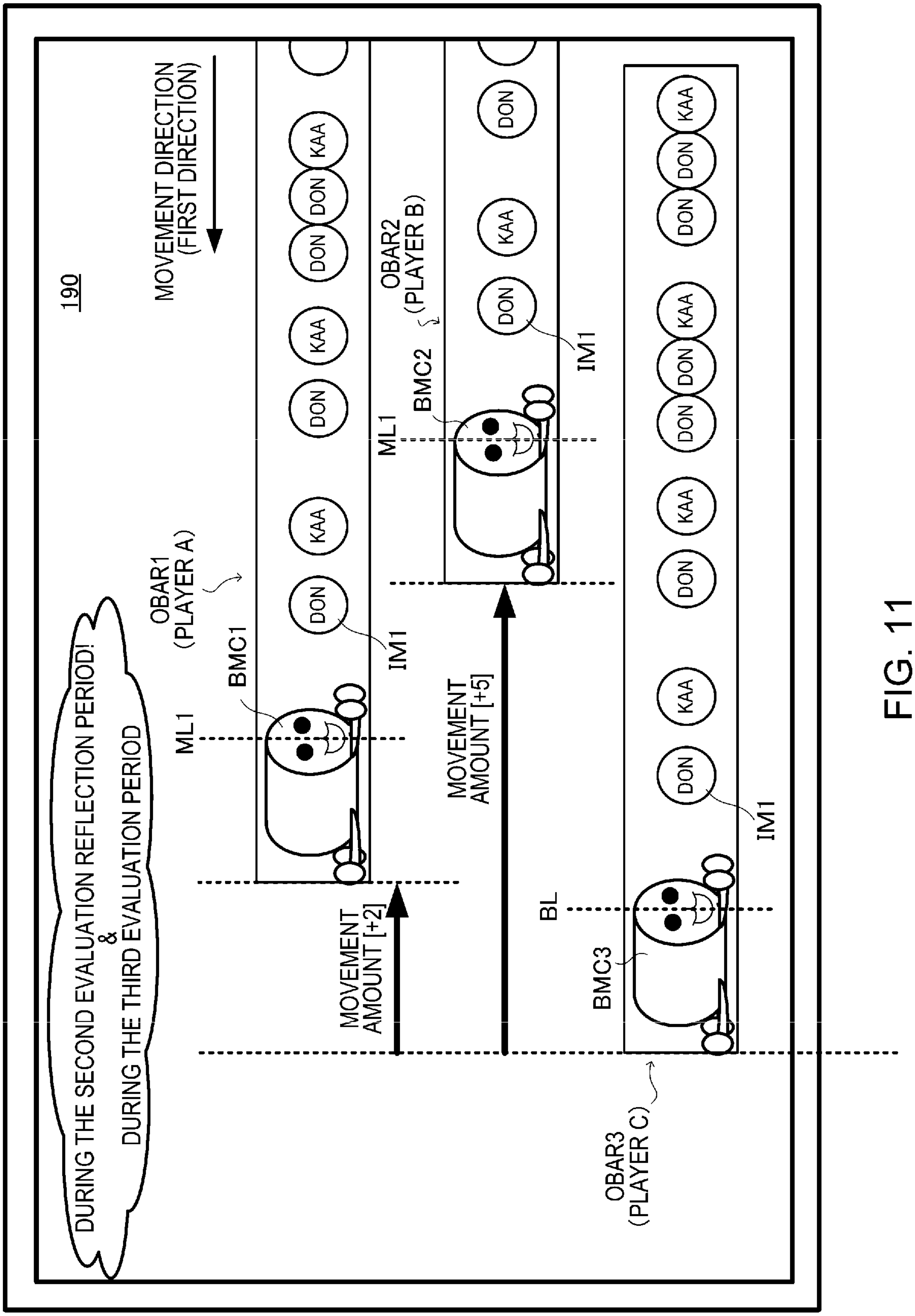
FIG. 11 is a diagram for explaining a display range control process according to the one embodiment of the present invention.

Also, as illustrated in FIG. 11, in the second evaluation period, when the evaluation process is performed with the evaluation value of the player A of the first place (total 3 players), the player B of the third place (total 3 players), and the player C of the second place (total 3 players), during a second evaluation reflection period in the second evaluation period, the game control unit 114 performs the display range control process: of moving, "+5" of a predetermined unit amount (+7 from when the game starts), the operating-system object formation area OBAR1 of the player A in the second direction; and of moving, "+2" of a predetermined unit amount (+2 from when the game starts), the operating-system object formation area OBAR3 of the player c in the second direction by a predetermined unit amount.

In this case, the game control unit 114 maintains the position of the operation-system object formation area OBAR2 of the player B (+5 from when the game starts) without moving.

During performing the game, when the evaluation value in the evaluation period is significantly low as an absolute value (for example, in the case of plus addition "0"), the display range control process of moving the operating-system object formation area OBAR in a direction advantageous to the player (first direction) may be performed.

Figure 12:
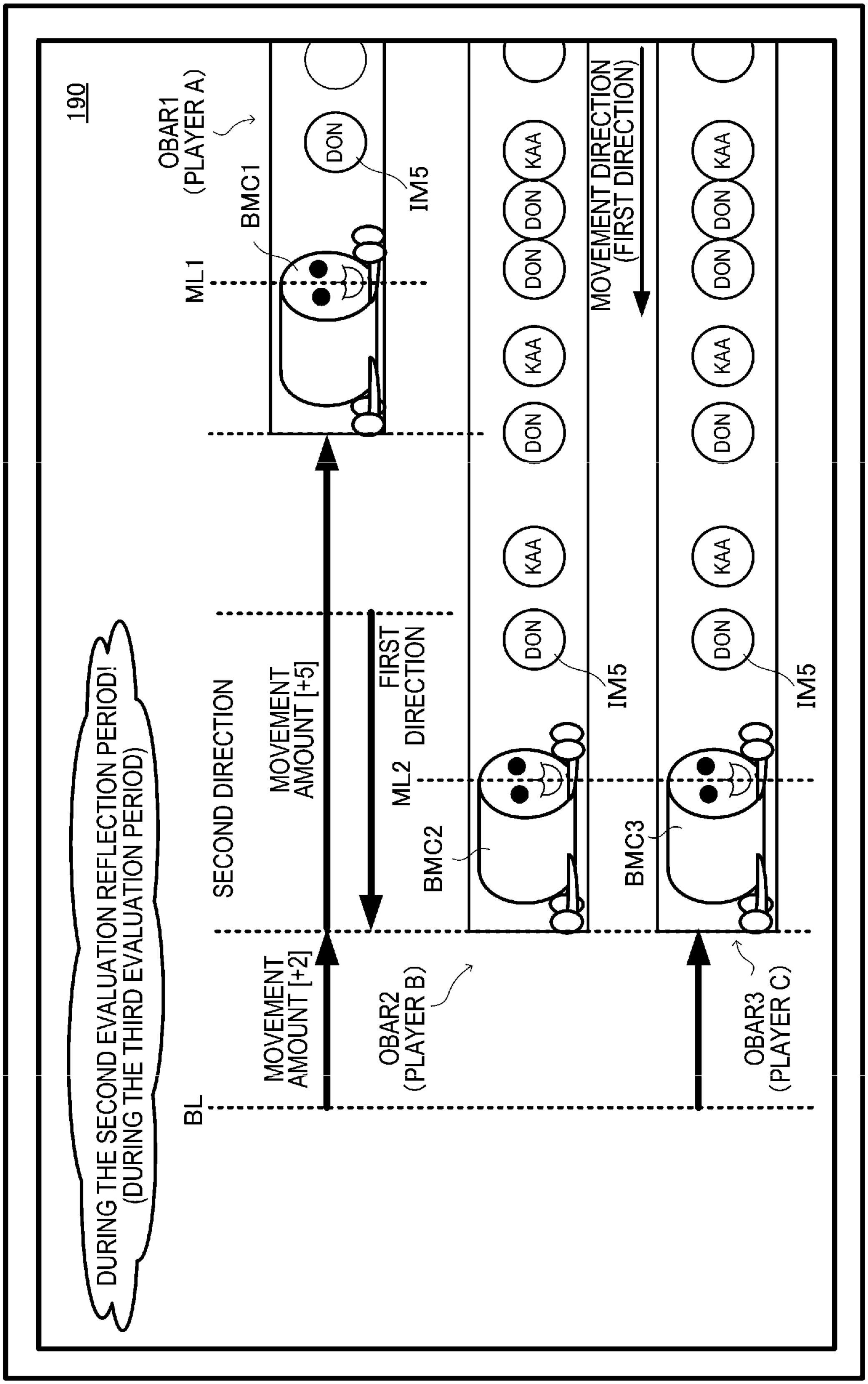
FIG. 12 a diagram for explaining a display range control process according to the one embodiment of the present invention.

For example, in the same case as in FIGS. 10 and 11 above, when evaluation process is performed in which the score addition of the player B as the evaluation value becomes "0" in addition to the above situation during the second evaluation period, as illustrated in FIG. 12, the game control unit 114 performs the display range control process based on a predetermined amount (for example, "−3" (plus from when the start of the game, +2)) in the first direction.

The game control unit 114 may non-display the entire area (as the limit value) of the operating-system object formation area by moving the operating-system object formation area. In this case, when all of the operating-system object formation areas are non-display, the game may not work. However, the difficulty of the game dramatically increases, and thus the game control unit 114 controls the movement of the operating-system object formation areas so that the mark object for determining operation input timing is displayed at a minimum.

In a case where, for each player, the movement direction or the movement amount of the operating-system object formation area is determined in advance in accordance with the evaluation in a given evaluation period through the evaluation process, the game control unit 114 may only determine, as the movement control content, the movement amount or the movement direction of the operating-system object formation area.

In principle, the game control unit 114 performs the display range control process based on the evaluation results of each player's period evaluation process for each player. In addition to the principle, the game control unit 114 may performs the display range control process based on the results of the individual operation timing evaluation processes for each player.

Specifically, when performing the display range control process based on the results of the individual operation timing evaluation processes for each player, the evaluation process unit 115 only performs the individual operation timing evaluation processes for each player.

[3.5] Special Process

Figure 13:
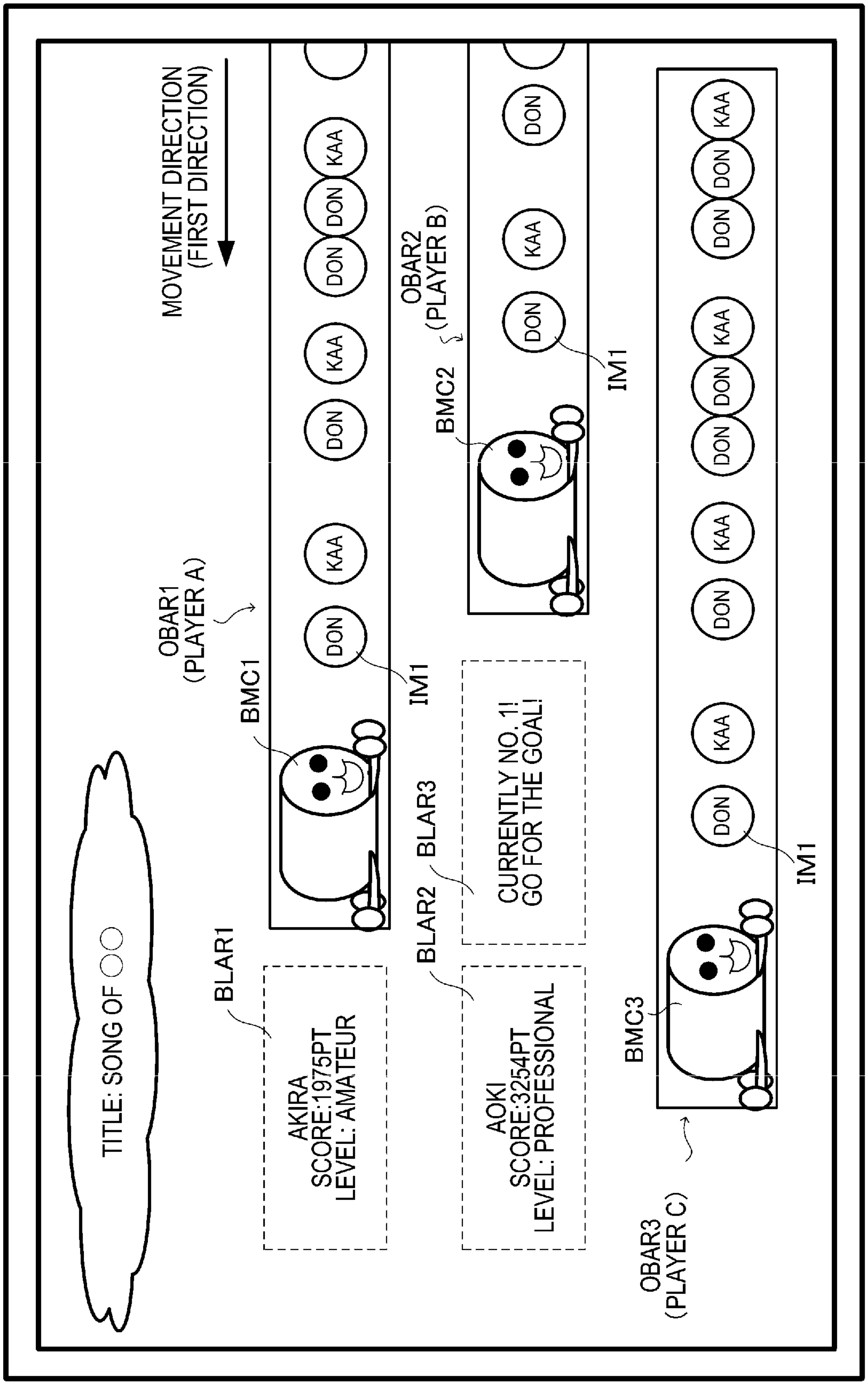
FIG. 13 is a diagram for explaining display associated with movement of the operating-system object formation region according to the embodiment of the invention.
Figure 14:
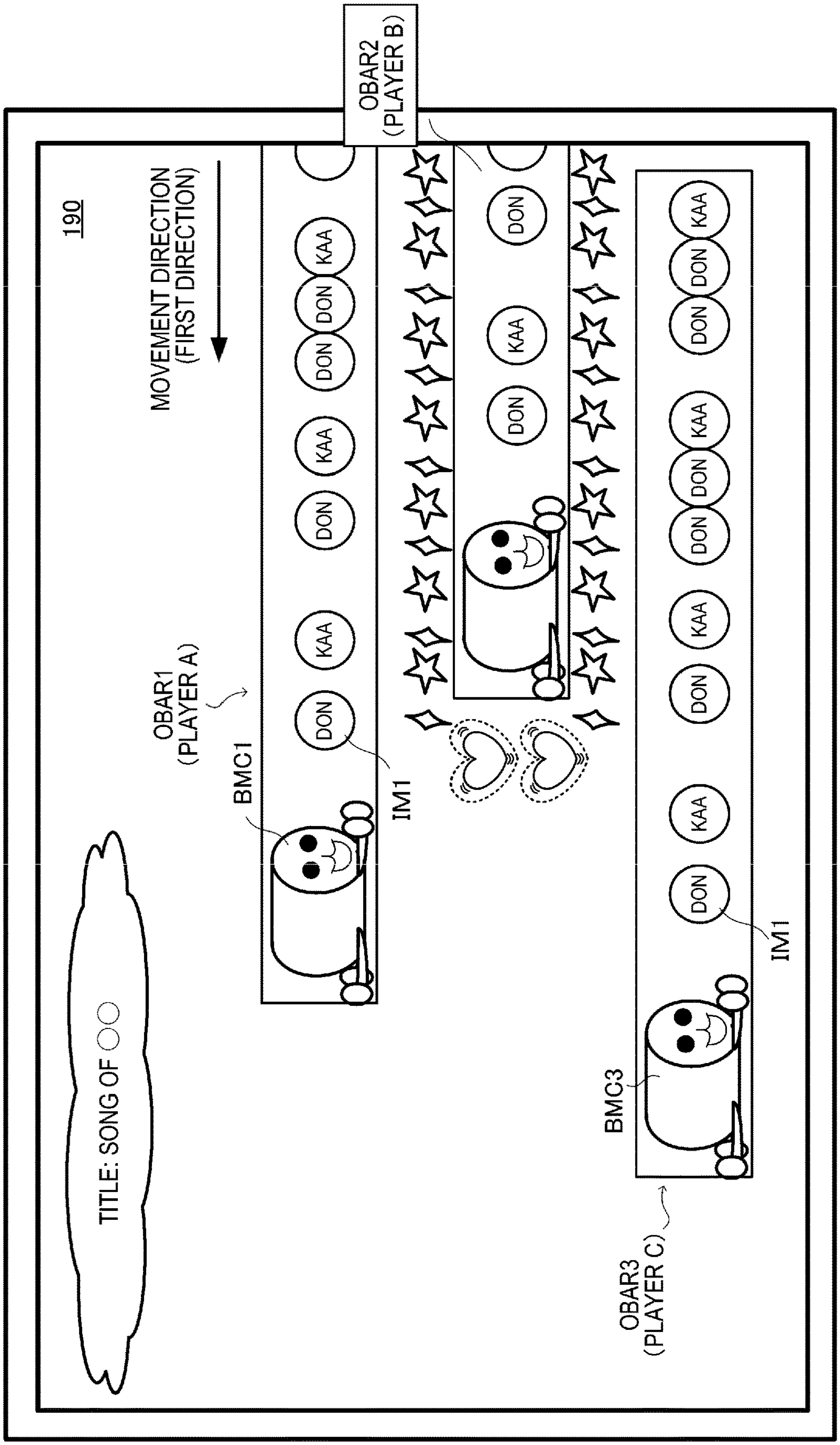
FIG. 14 is a diagram explaining display associated with movement of the operating-system object formation region according to the one embodiment of the invention.

Next, the special process in the present embodiment will be described with reference to FIGS. 13 and 14. FIGS. 13 and 14 are diagrams illustrating display associated with movement of the operating-system object formation area according to the present embodiment.

(Evaluation Process Based on Combination of the Plurality of Players)

In the above-described embodiment, the evaluation process unit 115 performs the evaluation process for each player. In addition to the above, the evaluation process unit 115 may performs one of evaluation processes for each of a plurality of players (that is, for each group).

In other words, as the evaluation process, the evaluation process unit 115 may combine each evaluations based on the operation inputs of each player in the same group (for example, sum the respective evaluations) with each group constituted of a plurality of players (for example, when four players join, two groups) to identify a combined evaluation.

In this case, when forming an operating-system object formation area for each player, the game control unit 114 may performs the display range control process for the operating-system object formation area of each player based on the corresponding combination evaluation. Further, when the operating-system object formation area is formed for each group, the game control unit 114 may performs the display range control process for the operating-system object formation area on the basis of the evaluation results for each group.

(Control of Non-Display Range of the Operating-System Object Formation Area Based on the Number of Players)

In the above embodiment, when determining the movement amount of operating-system object formation area in each player in accordance with evaluation results, and when setting the part of the operating-system object formation area to the non-display range, the game control unit 114 changes the setting ratio of the operating-system object formation area to the non-display range based on the number of players participating in the rhythm battle game (that is, the number of players during the execution of the game).

For example, the game control unit 114 is configured to be able to control the rhythm battle game so that the visibility of the player during the game is improved and the players are allowed to play the tight game even if there is a difference in ability between the players, such as setting more or less areas to be hidden during the game than when the number of players is small when the number of players is large.

In this case, when the number of participating players is eight, the game control unit 114 determines the movement amount of the operating-system object formation area by 25% more than when the number of participating players is four, and sets at least a part of the operating-system object formation area to the non-display range based on the movement amount.

(Display Associated with Movement of the Operation System Object Formation Region 1)

In the above-described embodiment, the display control unit 118 may display, as player information, information about a game of a player (i.e., a player corresponding to the Operation System Object) corresponding to a space (i.e., a blank area) vacated with Movement of the Operation System Object Formation Region.

In other words, in order to effectively utilize the blank area, when the operating-system object formation area is moved in a direction disadvantageous to the player (specifically, the second direction) by the display range control process, the display control unit 118 may display, in an area where the operating-system object formation area is formed before the movement and where no longer is formed after the movement of the operating-system object formation area (hereinafter, referred to as "blank area"), the information on the game of a corresponding player (i.e., the player corresponding to the operation-system object formation area.) as player information.

For example, as illustrated in FIG. 13, when the operating-system object formation area OBAR1 corresponding to the player A and an operating-system object formation area OBAR2 corresponding to the player B move in the second direction (rightward in the figure) by the display range control process, respectively, and blank areas BLAR1, BLAR2 and BLAR3 are formed on the left side of the operating-system object formation areas OBAR1 and OBAR2, the display control unit 118 displays player information such as the name of the player (nickname), score, and current level in each of the blank areas BLAR.

(Display Associated with Movement of the Operation-System Object Formation Region 2)

In the above-described embodiment, the production control unit 116 may control a given production for the operating-system object formation area in accordance with the movement amount of the operation-system object formation area generated by performing the display range control process.

For example, as illustrated in FIG. 14, when the movement amount of the operating-system object formation area is greater than the movement amount of the operating-system object formation area of another player by performing the display range control process, the production control unit 116 may perform the eye-catching production effects of the operating-system object formation area more than the operating-system object formation area corresponding to another player (such as making the periphery of the operating-system object formation area shine or changing the color to a dispatcher color).

(Variable Control of Movement Amount of Operation-System Object Formation Area)

In the above-described embodiment, the game control unit 114 may perform the display range control process: of amending the movement amount of the operating-system object formation area in accordance with the evaluation result of the evaluation process and the game result of each player; and moving the operating-system object formation area on the basis of the amended movement amount.

In this case, the movement amount of the operating-system object formation area of the player with a low game result can be increased, or the movement amount of the operating-system object formation area of a player with a significantly high game result can be decreased. Therefore, the production of the game can be provided so that the game is closed even if there is a difference in ability between the players, and the game can be livened up.

Specifically, the game control unit 114 determines the movement amount based on the evaluation results of each player. Further, the game control unit 114 sets a limit value of the movement amount, and controls the movement amount so that when the movement amount is not less than a certain amount even when the evaluation results (for example, scores) of specific players are significantly higher than the evaluation results (scores) of other players.

(Variable Control of Movement Amount at the Timing of the Progress of Operation-System Object Formation Area)

In the above-described embodiment, the game control unit 114 may perform the display range control process: of amending the movement amount of the operating-system object formation area in accordance with the evaluation result of the evaluation process and the degree of progress of the game; and moving the operating-system object formation area on the basis of the amended movement amount.

In this case, as the game progresses or even when the evaluation result in the latter half period of the game is the same as in the first half period of the game, the movement amount of the operating-system object type area can be varied. Therefore, the production of the game can be provided so that the game is closed even if there is a difference in ability between the players, and the game can be livened up.

Specifically, in this case, the game control unit 114 determines the movement amount based on the evaluation results of each player. Further, the game control unit 114 changes the movement amount even when the evaluation results in the first half period of the game is the same as the evaluation result in the second half period of the game (for example, the movement amount in the second half period is increased by 25% of the movement amount in the first half period), Therefore, even when the difference between the evaluation results in the first and second half periods of the game is large, the game control unit 114 controls the movement amount so that the arrangement positions of the operation-system object formation areas of the specific player and the other players are not too far apart during the latter half of the game (for example, the horizontal position of the mark object for determining operation input timing when displayed on the display 190).

(Special Item Appearance Control)

In the above-described embodiment, during execution of the rhythm battle game, the game control unit 114 may control to appear and to obtain the special item that allows the player to have an advantage in the game, such as doubling the score of the evaluation result according to the game status of each player, obstructing display of an operation timing object of another player, and changing the display range of an operating-system object formation area.

Specifically, as a game status, the game control unit 114 causes the parameter of the item gauge to vary based on the individual operation timing evaluation process, and causes the corresponding player to acquire a specific item when a value of the parameter at the item gauge satisfies a predetermined condition (for example, a certain value or greater).

For example, the game control 114 may invoke the obtained item into the game immediately or based on a particular operation of the player.

When varying the parameter of the item gauge on the basis of the individual operation timing evaluation process, the game control unit 114 varies the parameter of the item gauge in accordance with the display range of the operating-system object formation area (for example, the movement amount and the movement direction of the operating-system object formation area), or in accordance with a period of time defined on the basis of music data, such as the first half, middle half, and half of the game.

[3.6] Modified Example

Next, a modified example according to the present embodiment will be described with reference to FIGS. 15 and 16.

Figure 15:
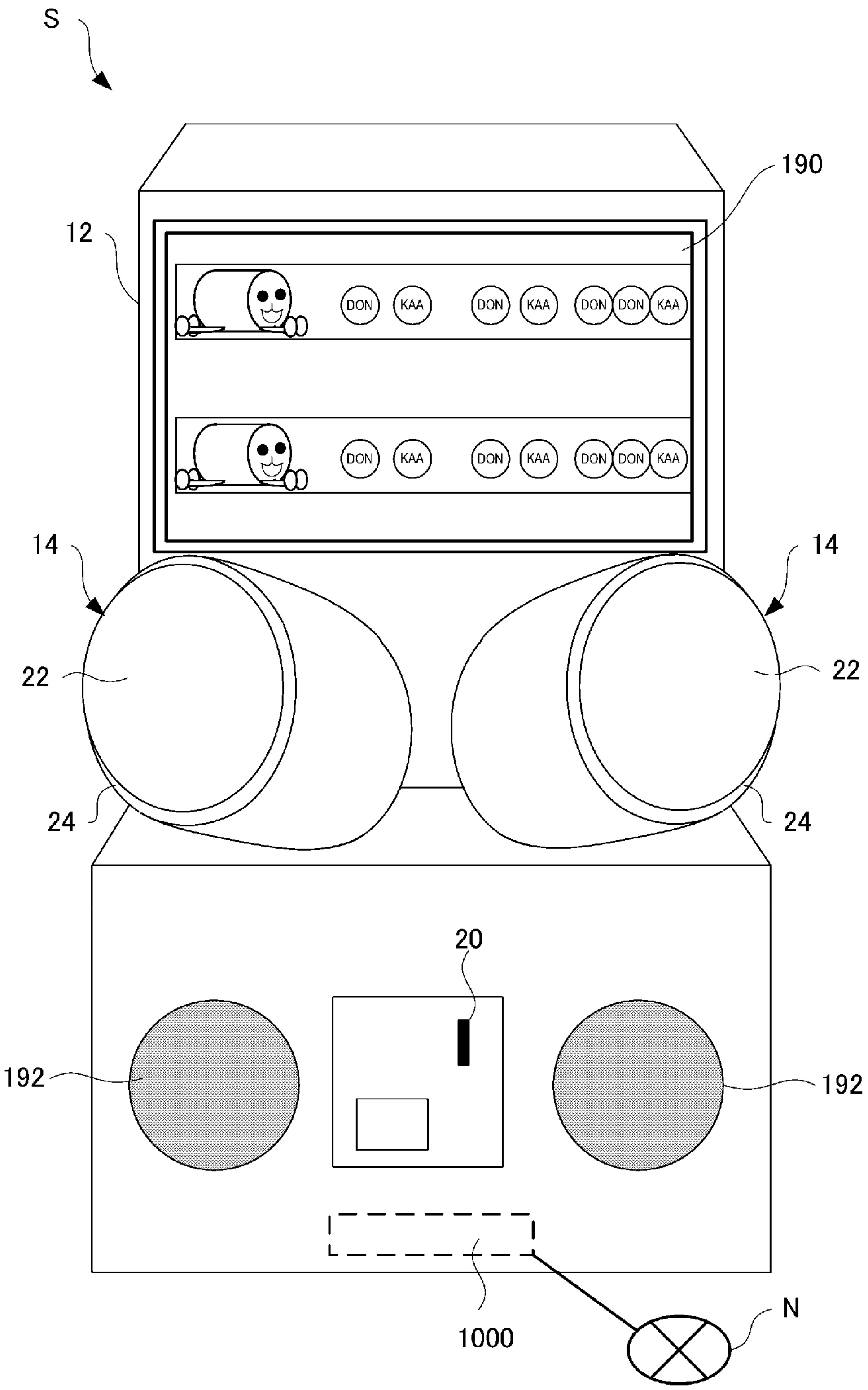
FIG. 15 is an external configuration diagram illustrating an example in which the game system that is applied to the store-type game system according to the embodiment of the present invention.

FIG. 15 is the outside drawing illustrating an example of an arcade game system based on the game system of the present embodiment. FIG. 16 is a system configuration diagram illustrating an example of the server system with a network based on the game system according to the present embodiment.

(Arcade Game System)

In addition to being applicable to a home-use game system, the game system S according to the present embodiment the game system S in the present embodiment can be implemented, as illustrated in FIG. 15, by an arcade game system set up in the store (amusement park).

For example, such a game system S includes, as illustrated in FIG. 15: a housing 12 that has a process unit (computer) 100 that performs game process and the like; an operation input unit 14 of two Japanese drum type (an example of a musical instrument) on a front face of the housing 12; a display unit 190 configured to display an image; a sound output unit 192 configured to output sound; and a toll intake port 20 configured to accept a game toll, and executes a music game.

The operation input section 14 has a Japanese drum shape, and accepts the player's operation inputted by tapping with a stick or a hand.

Although not illustrated, a sensor, which is configured to detect hitting on a circular skin surface 22 of the operation input section 14, is provided inside the circular skin surface 22. Further, a sensor, which is configured to detect hitting on the peripheral edge 24 of the circular skin surface 22, is provided inside the peripheral edge 24 of the skin surface 22. Accordingly, the game system S can determine whether the player hits the skin surface 22 or the peripheral edge 24 of the skin surface 22.

The game system S has the system board 1000 that has the CPU, image generation IC, sound generation IC and the like. The game system S is configured to perform the rhythm battle game based on the game program and game data read from a memory, which is an information storage medium of the system board, and an instruction signal input from the controller 14.

The game system S according to the present embodiment includes two operation input sections 14, and two players can play a music game simultaneously.

(Network Battle Game)

The game system S of the embodiment described above includes a plurality of controllers 30, and allows each player to operate each controller 30 to establish the rhythm battle game. By communicatively coupling the plurality of game systems S via a network, the player character of each of the game systems S may be controlled, and each of the configurations and each of the controls described above may be executed in conjunction with each other including the game control process based on each of the game systems S.

(Sever System)

Figure 16:
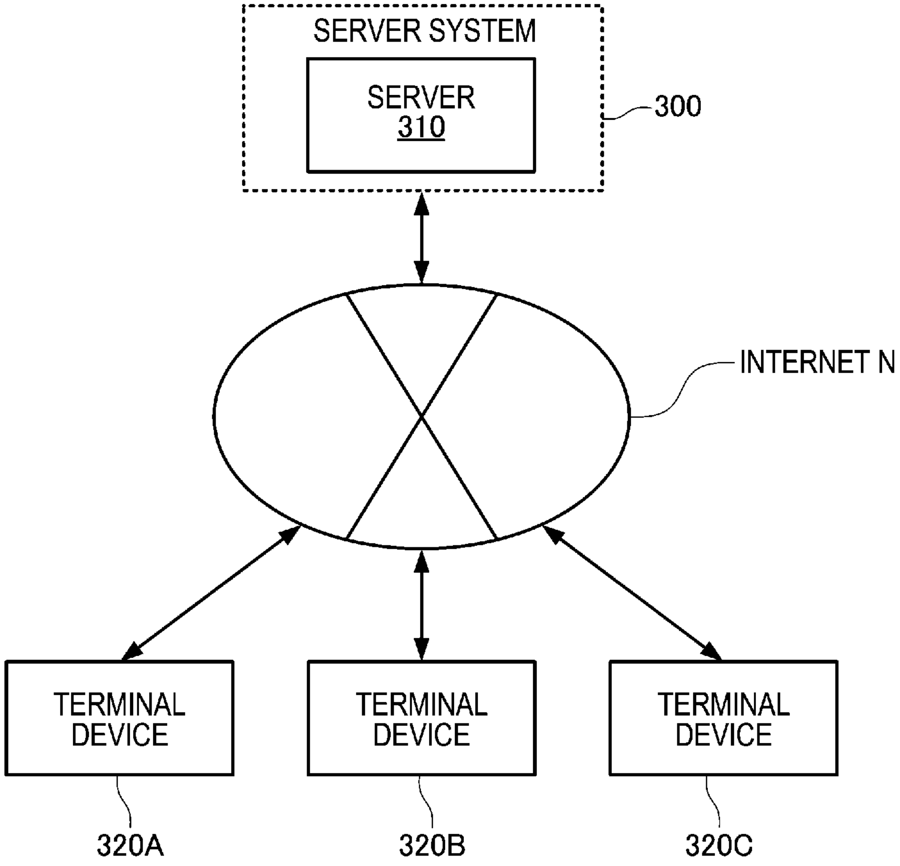
FIG. 16 is a diagram illustrating an example in which the game system that is applied to a server system using a network according to an embodiment of the present invention.

In the above embodiment, as shown in FIG. 16, the server system 300 may has one server 310 to provide the above game to one or more terminal devices 320 via a network N. Alternatively, the server system 300 may has a plurality of servers 310 may work together to provide the game to one or more terminal devices 320.

Specifically, the server system 300 works as the above game system while connecting the plurality of terminal devices 320 to the server system 300 via a network N by wired communication or wireless communication.

The server system 300 may serve as the game system by accepting the player's operation input and by providing, to the relevant terminal device 320, the game data for performing the game control processes including the operating-system object movement control process, the evaluation process, the display range control process.

Specifically, in this case, the game system 300 performs:

(A1) the display range control process of controlling a display range of an operating-system object formation area associated with each of the players, the operating-system object formation area being an area in which the mark object for determining an operation input timing and the operation timing object of each of the players are formed;

(A2) the operation-system object movement control process of moving at least one of the mark object for determining operation input timing and the operation timing object in the operating-system object formation area in the first direction; and (A3) the evaluation process of evaluating each player based on the operation input timing when a player's operation input is received, and the given relationship between the mark object for determining an operation input timing and the operation timing object at the operation input timing.

As the display range control process of (A1), the game system 300 is configured to move, in a second direction that is a direction opposite to the first direction, the corresponding operating-system object formation area including the mark object for determining operation input timing and the operation timing object in accordance with the evaluation of the evaluation process; and set at least a part of the operating-system object formation area to the non-display range (i.e., the non-display range).

Although the game system of the present invention is applied to the server system 300 that runs in conjunction with the terminal device 320 through the network, the game system of the present invention may also be applied to the tablet-type information terminal device and the personal computers.

[4] Operation of Present Embodiment

Next, the operations of the game control process when performing the game system S of the present embodiment will be described with reference to FIG. 17.

Figure 17:
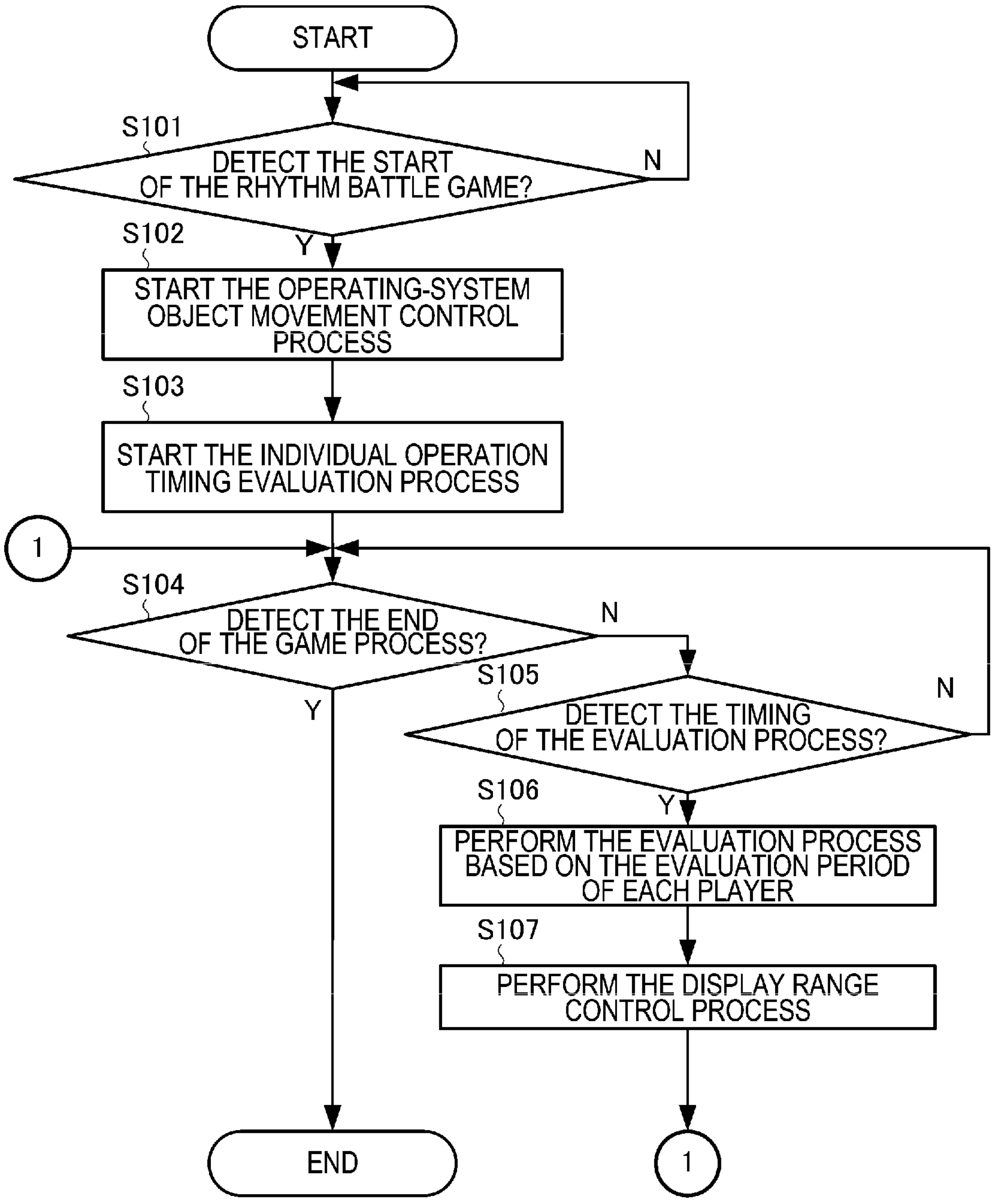
FIG. 17 is a flowchart of operations of a game control process performed by the game system of an embodiment.

FIG. 17 is a flowchart of operations of a game control process performed by the game system of an embodiment.

This operation is a game control process performed by the plurality of players and mainly relates the operating-system object movement control process and the display range control process regarding of the operating-system object formation area.

In the operation, it is assumed that predetermined music data is already selected by a player and read along with music score data to prepare to play the selected music data.

First, the game control unit 114 starts a rhythm battle game by a plurality of players based on a player instruction or the like (step S101).

Next, the game control unit 114 causes the music player unit 117 to start playing the music data, and starts the operating-system object movement control process of moving for sequentially causing operation timing objects to appear and move the operation timing objects toward the mark objects for operation input timing determination in the first direction is started in accordance with the piece of music data being played (step S102).

Next, the evaluation process unit 115 starts, for each player, performing the individual operation timing evaluation process on the basis of the individual evaluation timings at which the movement-controlled individual operation timing objects reaches the positions of the mark objects for determining input timing for each player (step S103).

Specifically, the evaluation process unit 115 determines whether evaluation conditions are met for each player and each individual operation timing, and identifies the evaluation score for each player based on the result.

Next, the game control unit 114 determines whether playing the music data has ended (step S104).

At this time, when playing the music data has ended, the game control unit 114 ends the operating-system object movement control process, and when playing the music data has not ended, the game control unit 114 moves to the process of the step S105.

Next, the evaluation process unit 115 determines whether it is timing for performing the evaluation process based on the first or next evaluation period (step S105).

Specifically, the evaluation process unit 115 determines whether it is the timing at which the evaluation period ends, such as the timing at which the first bar or the next bar ends.

At this time, when determining that it is not timing for performing the evaluation process based on the evaluation period, the evaluation process unit 115 moves to the process of the step S104, and when determining that it is timing for performing evaluation process based on the evaluation period, the evaluation process unit 115 moves to the process of the step S106.

Next, when determining that it is timing for performing the evaluation process based on the evaluation period, the evaluation process unit 115 performs the evaluation process based on the evaluation period for each player (step 106).

Specifically, the evaluation process unit 115 acquires the evaluation values (for example, scores) for each player in the evaluation period.

Next, the game control unit 114 performs the display range control process (including a case where the position of the operating-system object formation area is unchanged and maintained) with respect to the operating-system object formation area for each player on the basis of the result of the evaluation process of each player (step S107), and moves to the process of step S104.

For example, in the process of step S107, the game control unit 114:

(A1) moves the operating-system object formation area from the current position to the position indicated by a predetermined movement amount in a movement direction (i.e., a second direction) opposite to a movement direction (i.e., a first direction) of the operation timing object regarding the players whose the evaluation value is higher than the first reference value;

(A2) moves the operating-system object formation area from the current position to the position indicated by a predetermined movement amount in the same direction as the direction of movement of the operation timing object (i.e., the first direction) regarding the players whose the evaluation value is less than or equal to the second reference value; or (A3) maintains the position of the operating-system object formation area regarding the player whose evaluation value is equal to or less than a first reference value and higher than the second reference value.

The display control unit 118 performs the movement-control of the operation timing object with respect to the mark object for determining operation input timing based on the music score data in the operating-system object formation area along the music data even when moving the operating-system object formation area has moved by the display range control process or has not moved.

Next, the display control unit 118 performs the display of the mark object for determining operation input timing and the movement display of the operation timing object on the basis of the musical score data in the operation-system object formation area after the movement (step S206), and terminates this operation.

[5] Other

The present embodiment is not limited to those in the above-described embodiments, and various modifications and variations can be made. For example, words cited as broadly or synonymously in the description or drawings may be replaced by broadly or synonymously in the description or drawings.

The present embodiment describes the game in which a player is operated in accordance with a sound or rhythm such as a music game (sound game) and the like, and the accuracy of the operation input timing of the player is evaluated. Further, any game capable of evaluating the operation timing of the player is applicable as the game of the present embodiment.

The present embodiment includes substantially the same configuration as the configuration described in the embodiment (for example, configuration with the same function, method and result, or configuration with the same purpose and effect). The present embodiment also includes a configuration in which non-essential parts of the configuration described in the embodiment are replaced. The present embodiment also includes a configuration that achieves the same effects as the configuration described in the embodiment or a configuration that can achieve the same purpose. The embodiment also includes a configuration obtained by adding a known technique to the configuration described in the above embodiment.

Although the present embodiments have been described in detail as described above, it will be readily apparent to those skilled in the art that many variations are possible without departing materially from the new matter and effect of the present invention. Accordingly, all such modifications are intended to be within the scope of the present invention.

REFERENCE SIGNS LIST

S: Game system
1: Server
10: Game main unit
30: Controller
100: Process Unit
104: Music player
106: Display Controller
108: Drawing unit
110: Communication controller
112: Music player
113: Operation Input Receiving Processing Unit
114: Game Control Unit
115: Evaluation Processing Unit
116: Performance Control Unit
117: Music player unit
118: Display control unit
120: Drawing unit
130: Sound processor
160: Controller
162: Read/write unit
170: Memory unit
172: Main memory unit
174: Image buffer
176: Music data memory unit
180: Information storage medium
190: Display
192: Sound output unit
196: Communication unit

300: Server system

310: Server

320: Terminal device

1000: System board

What is claimed is:

1. A game system for controlling a given game evaluating operational inputs of each player entered by a plurality of players, the system comprising one or more processors and one or more memories, the processor programmed to:

receive operational inputs of the players;

perform a display range control process of controlling a display range of an operating-system object formation area for each of the players, the operating-system object formation area being an area where a first game object to be subjected to operation input by each player and a second game object different from the first game object and used to instruct each player to input operation are formed;

perform at least one of a movement control process of moving the second game object in a first direction within the operating-system object formation area and a movement control process of moving the first game object in a second direction that is a direction opposite the first direction;

perform, for each player, an evaluation process of evaluating each player on the basis of an operation input and a given relationship between the first game object and the second game object in the operation input, the display range control process of: moving the operating-system object formation area including the first game object and the second game object toward the second direction in accordance with an evaluation result of the evaluation process; and of setting, to a non-display range, at least a part of the operating-system object formation area.

2. The game system according to claim 1, wherein the first game object is a mark object for determining operation input timing that is used to determine operation input timing for each of the players, and the second game object is an operation timing object that indicates operation input timing for each players, and the processor is programmed to evaluate, as the evaluation process, each player based on the operation input timing when an operation input of the player is received and the given relationship between the mark object for determining operation input timing and the operation timing object at the operation input timing.

3. The game system according to claim 1, wherein the processor is programmed to perform the display range control process of moving at least a part of the operating-system object formation set in the non-display range into the display range by moving at least the part of the operating-system object formation area that has already set in the non-display range in the first direction in accordance with the evaluation result of the evaluation process.

4. The game system according to claim 1, wherein:

the processor is programmed to:

perform the evaluation process of evaluating each player at a given evaluation timing; and perform the display range control process of determining, in accordance with the evaluation result at the evaluation timing, movement control content of at least one of a movement direction and a movement amount of the operating-system object formation area; and of moving the operating-system object formation area based on the determined movement control content.

5. The game system according to claim 1, wherein:

the processor is programmed to:

perform the evaluation process of evaluating each player at a given evaluation period; and perform the display range control process of determining, in accordance with the evaluation result in the evaluation period, movement control content of at least one of a movement direction and a movement amount of the operating-system object formation area; and of moving the operating-system object formation area based on the determined movement control content.

6. The game system according to claim 1, wherein:

the processor is programmed to:

perform the evaluation process of determining whether a result of the operation of the player or a result of the game being executed based on the operation of the player meets a given condition; and of identifying the result of the determination as the evaluation; and move the operating-system object formation area in accordance with an evaluation of a result of the determination.

7. The game system according to claim 1, wherein:

the processor is programmed to:

perform the evaluation process of identifying combination of evaluations evaluated based on the operation input of each player of the same group for each group constituted by the plurality of player; and perform the display range control process of control the display range of the operating-system object formation area in accordance with the specified combination of the evaluations.

8. The game system according to claim 1, wherein the processor is programmed to when performing the display range control process, change a setting ratio of the non-display range of the operating-system object formation area in accordance with the evaluation, based on a number of players in which the game is executed.

9. The gaming system according to claim 1, the processor is programmed to display information regarding the game of the player as player information in a blank area generated by the movement of the operating-system object formation area.

10. The game system according to claim 1, the processor is programmed to control a given production for the operating-system object formation area in accordance with a movement amount of the operating-system object formation area caused by performing the display range control process.

11. The game system according to claim 1, wherein the processor is programmed to:

amend a movement amount of the operating-system object formation area in accordance with the evaluation result of the evaluation process and a game result of the player; and move the operating-system object formation area in a second direction that is a direction opposite to the first direction on the basis of the amended movement amount.

12. The game system according to claim 1, wherein the processor is programmed to:

amend a movement amount of the operating-system object formation area in accordance with the evaluation result of the evaluation process and a degree of progress of the game; and move the operating-system object formation area in a second direction that is a direction opposite to the first direction on the basis of the amended movement amount.

13. A game control method for controlling a given game evaluating operational inputs of each player entered by a plurality of players, the method comprising:

receiving operational inputs of the players;

performing a display range control process of controlling a display range of an operating-system object formation area for each of the players, the operating-system object formation area being an area where a first game object to be subjected to operation input by each player and a second game object different from the first game object and used to instruct each player to input operation are formed;

performing at least one of a movement control process of moving the second game object in a first direction within the operating-system object formation area and a movement control process of moving the first game object in a second direction that is a direction opposite the first direction; and performing, for each player, an evaluation process of evaluating each player on the basis of an operation input and a given relationship between the first game object and the second game object in the operation input; and performing the display range control process of moving the operating-system object formation area including the first game object and the second game object toward the second direction in accordance with an evaluation result of the evaluation process; and of moving at least a part of the operating-system object formation area to a non-display range.

* * * * *